(12) United States Patent
Kamiya et al.

(10) Patent No.: US 11,143,877 B2
(45) Date of Patent: Oct. 12, 2021

(54) HEAD-MOUNTED IMAGE DISPLAY DEVICE AND FACE MASK UNIT

(71) Applicant: SEIKO EPSON CORPORATION, Tokyo (JP)

(72) Inventors: Tomohide Kamiya, Shiojiri (JP); Toshiaki Miyao, Matsumoto (JP); Takeshi Fujishiro, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 503 days.

(21) Appl. No.: 16/104,474

(22) Filed: Aug. 17, 2018

(65) Prior Publication Data

US 2019/0056597 A1 Feb. 21, 2019

(30) Foreign Application Priority Data

Aug. 18, 2017 (JP) .............................. JP2017-158074

(51) Int. Cl.
*G02B 27/14* (2006.01)
*G02B 27/01* (2006.01)
*A62B 18/02* (2006.01)
*A62B 23/02* (2006.01)
*A62B 18/08* (2006.01)

(52) U.S. Cl.
CPC .......... *G02B 27/0176* (2013.01); *A62B 18/02* (2013.01); *G02B 27/0172* (2013.01); *A62B 18/08* (2013.01); *A62B 23/025* (2013.01); *G02B 2027/015* (2013.01); *G02B 2027/0132* (2013.01); *G02B 2027/0169* (2013.01)

(58) Field of Classification Search
CPC .................................................. G02B 27/0176
USPC ........................................................ 359/630
See application file for complete search history.

(56) References Cited

U.S. PATENT DOCUMENTS

2009/0059501 A1* 3/2009 Yamaguchi ............. A61F 9/029
361/679.27
2020/0319468 A1* 10/2020 Kobayashi ......... G02B 27/0176

FOREIGN PATENT DOCUMENTS

JP 2009-065310 A 3/2009

* cited by examiner

*Primary Examiner* — James C. Jones
(74) *Attorney, Agent, or Firm* — Oliff PLC

(57) ABSTRACT

A head-mounted image display device includes a device main body configured to display an image to allow a user to view the image, and a supporting member configured to support the device main body, and to be mounted on the head of the user. The supporting member includes an upper extension portion and a lower extension portion, each extending in a left-and-right direction, and a light guide member configured to guide the image to an eye of the user is interposed between the upper extension portion and the lower extension portion in an up-and-down direction of the user.

11 Claims, 14 Drawing Sheets

HEAD-MOUNTED IMAGE DISPLAY DEVICE AND FACE MASK UNIT

The present application is based on and claims priority from JP Application Ser. No. 2017-158074, filed Aug. 18, 2017, the disclosure of which is hereby incorporated by reference herein in its entirety.

BACKGROUND

1. Technical Field

The disclosure relates to a head-mounted image display device and a face mask unit.

2. Related Art

There is known an image display unit that is disposed in front of the eyes of a viewer to display images so that the viewer can view the images (for example, refer to JP-A-2009-065310).

The image display unit disclosed in JP-A-2009-06510 displays images to present the images as virtual images to the viewer while providing the viewer with see-through vision of the outside world. The image display unit is covered with a face mask (e.g., a dust-proof/water-proof mask) to be worn on the face of the viewer. When a natural disaster occurs, the image display unit displays instruction information from a director and outside images taken by an infrared camera, thus allowing the viewer to conduct rescue operations and other actions satisfactorily.

Such an image display unit includes image display devices, supporting means, a belt, and a cable. Of these components, the cable is for supplying the drive power and image signals from an external controller to the image display devices.

Each image display device has a shape conforming to the face mask. The image display device includes a light source that is disposed below the position of the pupils of the viewer, a display element that modulates light emitted from the light source and displays an image, and an ocular optical system that guides the light of the image displayed by the display element to the pupils Of these components, the ocular optical system includes an ocular prism, a deflecting prism, and a holographic optical element.

The supporting means is located in front of the face of the viewer and supports the image display devices. The supporting means includes a face abutment portion that comes in contact with the face of the viewer. The face abutment portion includes a forehead abutment portion that comes in abutment with the forehead of the viewer, cheek abutment portions that come in abutment with the cheeks of the viewer, and a nose pad.

The belt is a head-mounted member that is mounted on the head of the viewer and supports the supporting means. Both ends of the belt are connected to fixing pins which are located at the respective left and right ends of the supporting means. The belt enables the supporting means, which supports the image display devices, to be fixed to the head of the viewer even when the supporting means is not fixed to the face mask.

Alternatively, the supporting means, by including a face mask attachment for attaching to and detaching from the face mask, enables the image display devices to be disposed in front of the face of the viewer without such a belt.

In the image display unit disclosed in JP-A-2009-065310, the image display devices corresponding to the respective left and right eyes are separately fixed to the supporting means. Accordingly, unless the supporting means has a certain degree of rigidity, a force applied to the supporting means may bend the supporting means and thus displace the image display device.

In this respect, it is conceivable that a rigid frame is provided in the periphery of the supporting means or the supporting means itself is formed to have high rigidity. However, such a case results in an increased size of structure for supporting the image display devices, and thus the size of a face mask is increased to place the structure in the face mask. This may make it hard to handle the face mask and the image display unit.

As a result, there is a need for a configuration of a small-sized head-mounted image display device.

SUMMARY

The disclosure is to provide a small sized head-mounted image display device and a face mask unit for the image display device.

A head-mounted image display device according to a first aspect of the disclosure includes a device main body configured to display an image to allow a user to view the image, and a supporting member configured to support the device main body, and to be mounted on the head of the user. The device main body includes an emission unit configured to emit the image, and a light guide member extending in a left-and-right direction of the user, the light guide member configured to guide the image emitted from the emission unit to an eye of the user. The supporting member includes an upper extension portion and a lower extension portion, each extending in the left-and-right direction, and the light guide member is interposed between the upper extension portion and the lower extension portion in an up-and-down direction of the user. At least one of the upper extension portion and the lower extension portion includes a deformation restricting portion protruding toward a direction closer to the main body device to restrict deformation of the supporting member.

With that configuration, when a stress in the up-and-down direction is applied to the supporting member configured to support the device main body, the deformation restricting portion resists the stress, thus restricting the deformation of the supporting member. This eliminates the need to additionally use a component or structure for enhancing the rigidity of the supporting member. Therefore, a highly-rigid, small-sized supporting member is provided, and thus a head-mounted image display device is downsized.

In the first aspect, when a stress that deforms the supporting member is applied to the supporting member, the deformation restricting portion may come in abutment with the device main body to restrict the deformation of the supporting member.

With that configuration, the deformation restricting portion resists the stress, thus surely restricting the deformation of the supporting member, Therefore, the head-mounted image display device is surely downsized.

In the first aspect, the light guide member may include a left-eye light guide portion disposed to face the left eye of the user, a right-eye light guide portion disposed to face the right eye of the user, and a joint portion integrating the left-eye light guide portion and the right-eye light guide portion.

With that configuration, the rigidity of the light guide member is enhanced, and thus the rigidity of the device main body is also enhanced. This eliminates the need for additionally providing a component for enhancing the rigidity of the device main body, and thus not only the device main body but also the head-mounted image display device is downsized.

In the first aspect, the light guide member may include a left-eye light guide portion disposed to face the left eye of the user and a right-eye light guide portion disposed to face the right eye of the user, and the device main body may include a cover member, the cover member covering at least a part of the left-eye light guide portion and the right-eye light guide portion.

With that configuration, the light guide portion is protected by the cover member. In addition, even when the left-eye light guide portion and the right-eye light guide portion are separately provided, the integration of the light guide portions and the cover member enhances the rigidity of the device main body, thus enhancing the rigidity of the head-mounted image display device.

In the first aspect, the emission unit may include an optical component forming the image, and a housing configured to accommodate the optical component, the housing being attached to the light guide member.

Unless the relative position of the emission unit with respect to the light guide member is appropriate, the light guide member may fail to guide an image emitted from the emission unit to the eye of the user.

In contrast, with the configuration described above, it is easy to position the relative positions of the emission unit and the light guide member. Therefore, the image is surely guided to the eye of the user by the light guide member, and thus the reliability of the head-mounted image display device is enhanced.

In the first aspect, the supporting member may include coupling portions located at both ends in the left-and-right direction, the coupling portions coupling the upper extension portion and the lower extension portion, and the device main body may be fixed to the coupling portions.

With that configuration, the device main body is held by the supporting member at the coupling portions, which are located at both ends of the supporting member in the left and-right direction. Therefore, the device main body is stably supported by the supporting member, and thus the head-mounted image display device is stably mounted on the head.

In the first aspect, the head-mounted image display device may further include a connection portion configured to fix the device main body to one of the upper extension portion and the lower extension portion, the light guide member may include a left-eye light guide portion disposed to face the left eye of the user and a right-eye light guide portion disposed to face the right eye of the user, and the connection portion may be connected to a portion of the device main body between the left-eye light guide portion and the right-eye light guide portion.

In a case where a band for mounting the supporting member on the head of the user is attached to both ends of the supporting member in the left-and-right direction and the display device is supported at the both ends by the supporting member, a stress to the rear side of the user, when applied to the band, may also be applied to the emission unit, thus displacing the emission unit.

In contrast, the display device and the one extension portion are connected by the connection portion, and thus it is less likely to displace the emission unit even when the stress to the rear side is applied. The connection portion is connected to a portion of the device main body between the left-eye light guide portion and the right-eye light guide portion, that is, a substantially central portion of the device main body, and thus the device main body is stably supported by the supporting member.

In the first aspect, the head-mounted image display device may further include a band extending along the head, and the supporting member may include a band attachment portion located on the rear side with respect to the emission unit, an end of the band being attached to the band attachment portion.

With that configuration, the supporting member, which supports the device main body, is mounted on the head of the user by the band, and thus the device main body is disposed at a suitable position.

Moreover, the band attachment portion included in the supporting member is located on the head side of the user with respect to the emission unit, thus preventing the emission unit from interfering with the band. Accordingly, it is easy to fit the band on the head. Therefore, a wearing feel of the head-mounted image display device is enhanced. In addition, when a face mask that covers the device main body and the supporting member worn on the head of the user, the band prevents a space between the face mask and the head from be formed.

In the first aspect, the band attachment portion may include a left attachment portion located on a left side of the supporting member in the left-and-right direction and a right attachment portion located on a right side of the supporting member in the left-and-right direction, and at least one of the left attachment portion and the right attachment portion may be located at a position closer to the head than an end of the device main body on a side of the at least one of a left attachment portion and a right attachment portion side.

For example, in a case where the attachment portion is the left attachment portion, the left attachment portion is located closer to the head of the user (i.e., to the right) than a left end of the device main body. Conversely, in a case where the attachment portion is the right attachment portion, the right attachment portion is located closer to the head of the user (i.e., to the left) than a right end of the device main body.

With that configuration, is easier to fit the band to be attached to the attachment portion on the head of the user than the case where the attachment portion is disposed on the end side of the device main body. Specifically, it is easier to fit the band on the head of the user than the case where the left attachment portion is located closer to the left than the left end of the device main body or the case where the right attachment portion is located closer to the right than the right end of the device main body. Therefore, a wearing feel of the supporting member and the head-mounted image display device is enhanced. In addition, the band, when located between the head and the face mask in the state where the face mask is worn on the head, prevents an increase in the space between the head and the face mask.

A face mask unit according to a second aspect of the disclosure includes the head-mounted image display device and a face mask to be mounted on the head of the user to cover the face of the user. The device main body and the supporting member are disposed between the face and the face mask.

With that configuration, the face mask unit has the same advantageous effects as the head-mounted image display device according to the first aspect. In addition, the device main body and the supporting member are disposed between the face of the user and the face mask, which allows the user to view an image displayed by the device main body even in the state where the user wears the face mask. Therefore, a more versatile face mask unit is provided.

BRIEF DESCRIPTION OF THE DRAWINGS

Embodiments of the disclosure will be described with reference to the accompanying drawings, wherein like numbers reference like elements.

DESCRIPTION OF EXEMPLARY EMBODIMENTS

First Exemplary Embodiment

A face mask unit 1 according to First Exemplary Embodiment of the disclosure will be described below.

Configuration of Face Mask Unit

Figure 1:
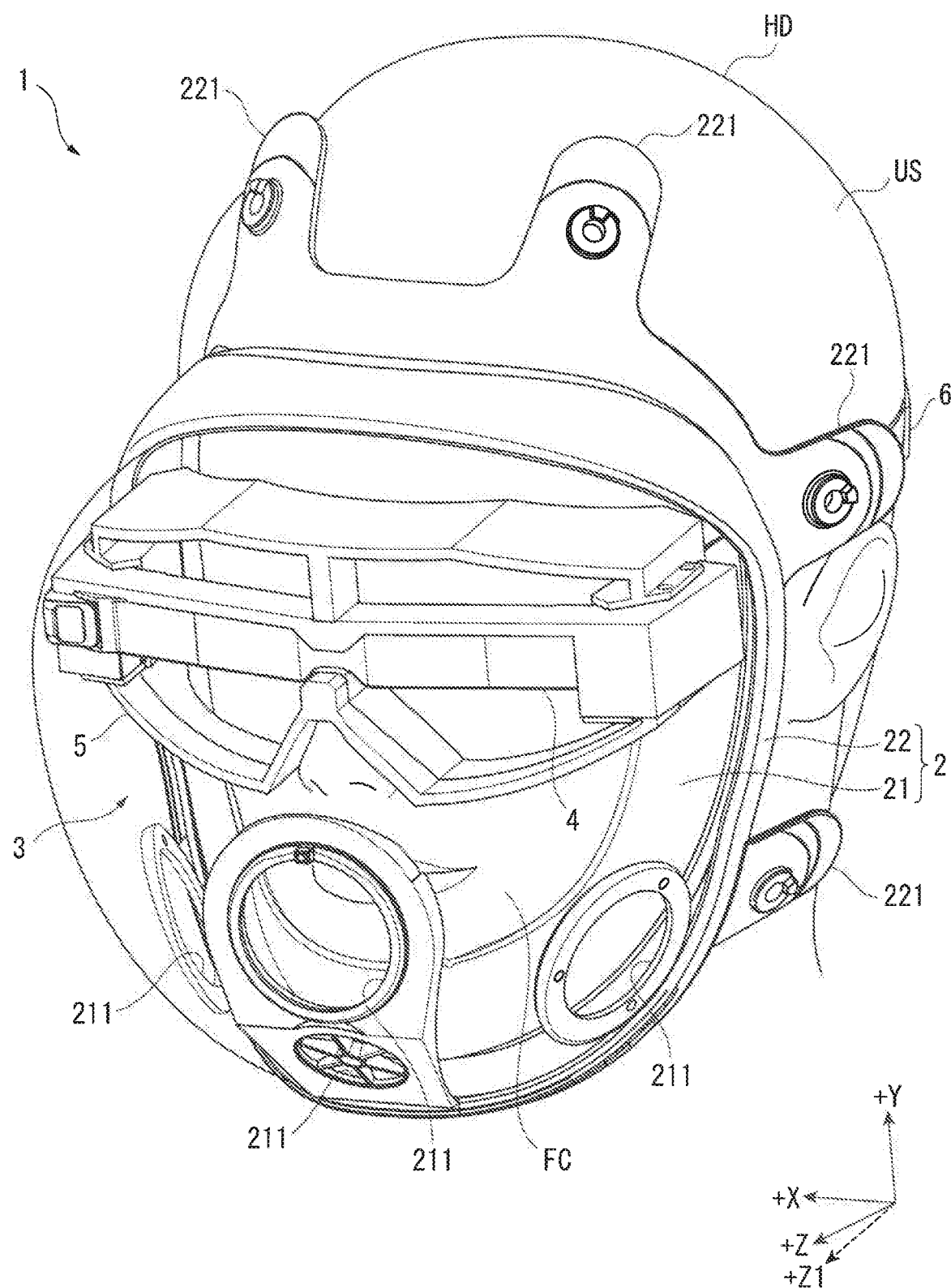
FIG. 1 is a front perspective view of a face mask unit according to First Exemplary Embodiment of the disclosure.
Figure 2:
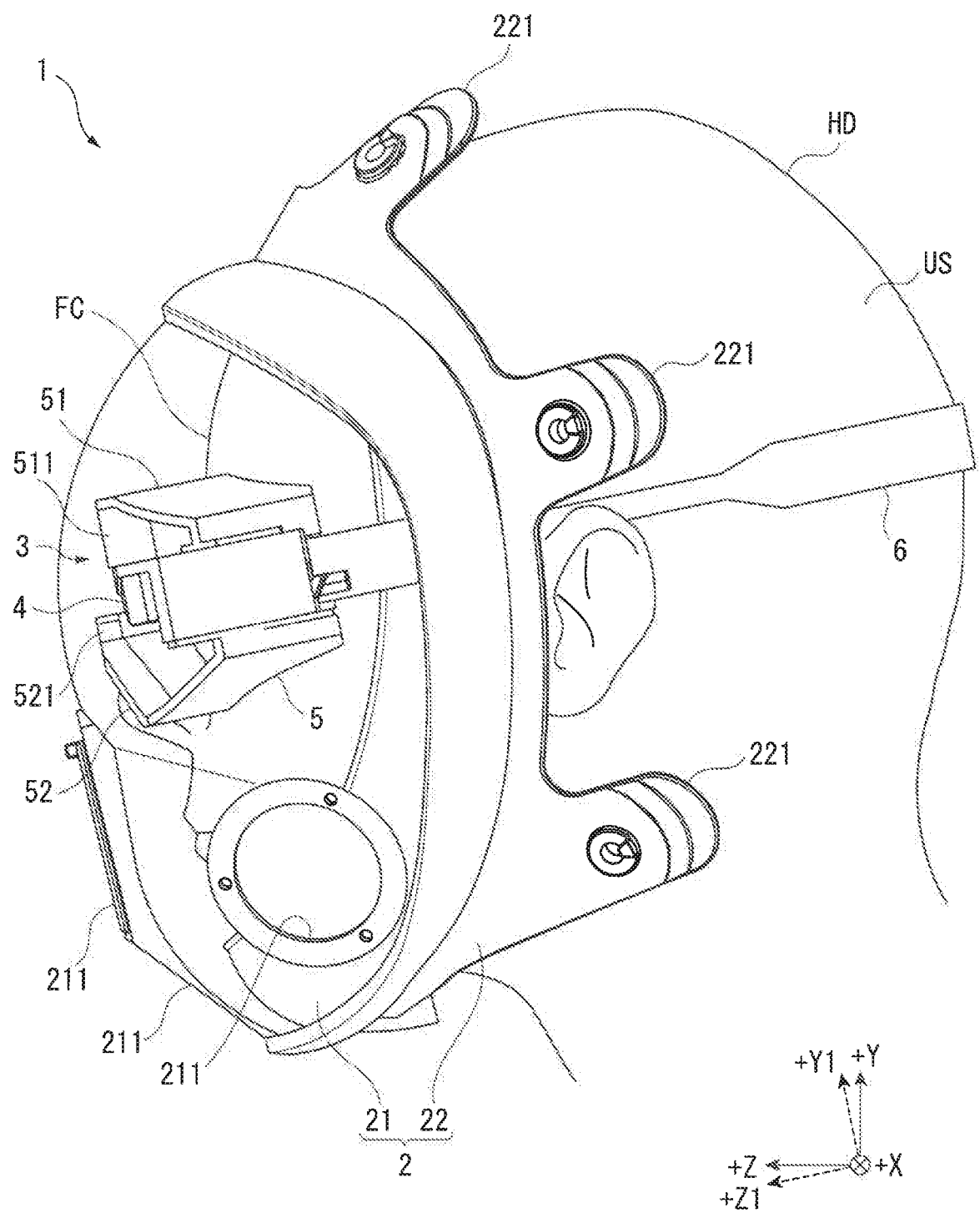
FIG. 2 is a left side view of the face mask unit of First Exemplary Embodiment.

FIG. 1 and FIG. 2 are a front perspective view and a left side view of the face mask unit 1 according to First Exemplary Embodiment, respectively. FIG. 1 and FIG. 2 illustrate the face mask unit 1 being mounted on the head HD of a user US. The face mask unit 1 according to First Exemplary Embodiment is used to protect the head HD of the user US (in particular, the face FC), for example, to be worn by a fire fighter in fire fighting. As illustrated in and FIG. 2, the face mask unit 1 includes a face mask 2 that is to be mounted on the user US and a display unit 3 that is to be worn on the user US and disposed within the face mask 2.

The face mask unit 1, which will be described in detail later, includes a supporting member 5 that constitutes the display unit 3 and also has a unique configuration. The configuration of the face mask unit 1 will be described in detail below.

In FIG. 1 and FIG. 2, of a +Z direction, a +X direction, and a +Y direction, which are perpendicular to one another, the +Z direction refers to a direction from the rear side to the front side of the user US, the +X direction refers to a direction from the left side to the right side of the user US, and the +Y direction refers to a direction from the lower side to the upper side of the user US. In addition, a −Z direction, while not illustrated, refers to a direction opposite to the direction. The same applies to a −X direction and a −Y direction.

FIG. 1 and FIG. 2 also illustrate a +Z1 direction that refers to a line-of-sight direction of the user US in the state where the user US wears the face mask unit 1. As illustrated in FIG. 2, the +Z1 direction is a direction inclined to the −Y direction side from the +Z direction, when viewed along the +X direction. This is because a person standing typically lowers his/her eyes a little, i.e., the line-of-sight is inclined downward (to the −Y direction).

Configuration of Face Mask

The face mask 2 is to be worn to cover the face FC of the user US on which the display unit 3 is mounted, and is, for example, a protective mask. The face mask 2 includes an eyepiece portion 21 that covers the face FC and an extension portion 22 that extends outward from a periphery of the eyepiece portion 21.

The eyepiece portion 21 made of a light transmissive material to have a semispherical surface, and is configured to allow the user US to view the outside world from the inside. In other words, the user US wearing the face mask 2 can view the outside world through the eyepiece portion 21. The eyepiece portion 21 includes a plurality of openings 211, and a canister or a filter is, while not illustrated, attachable to the openings 211.

The extension portion 22 includes a plurality of attachment portions 221, and a belt (not illustrated), which is fitted on the head HD of the user US (specifically, back of the head), is attached to the openings 211. The face mask 2 is worn on the head HD by the belt.

Configuration of Display Unit

Figure 3:
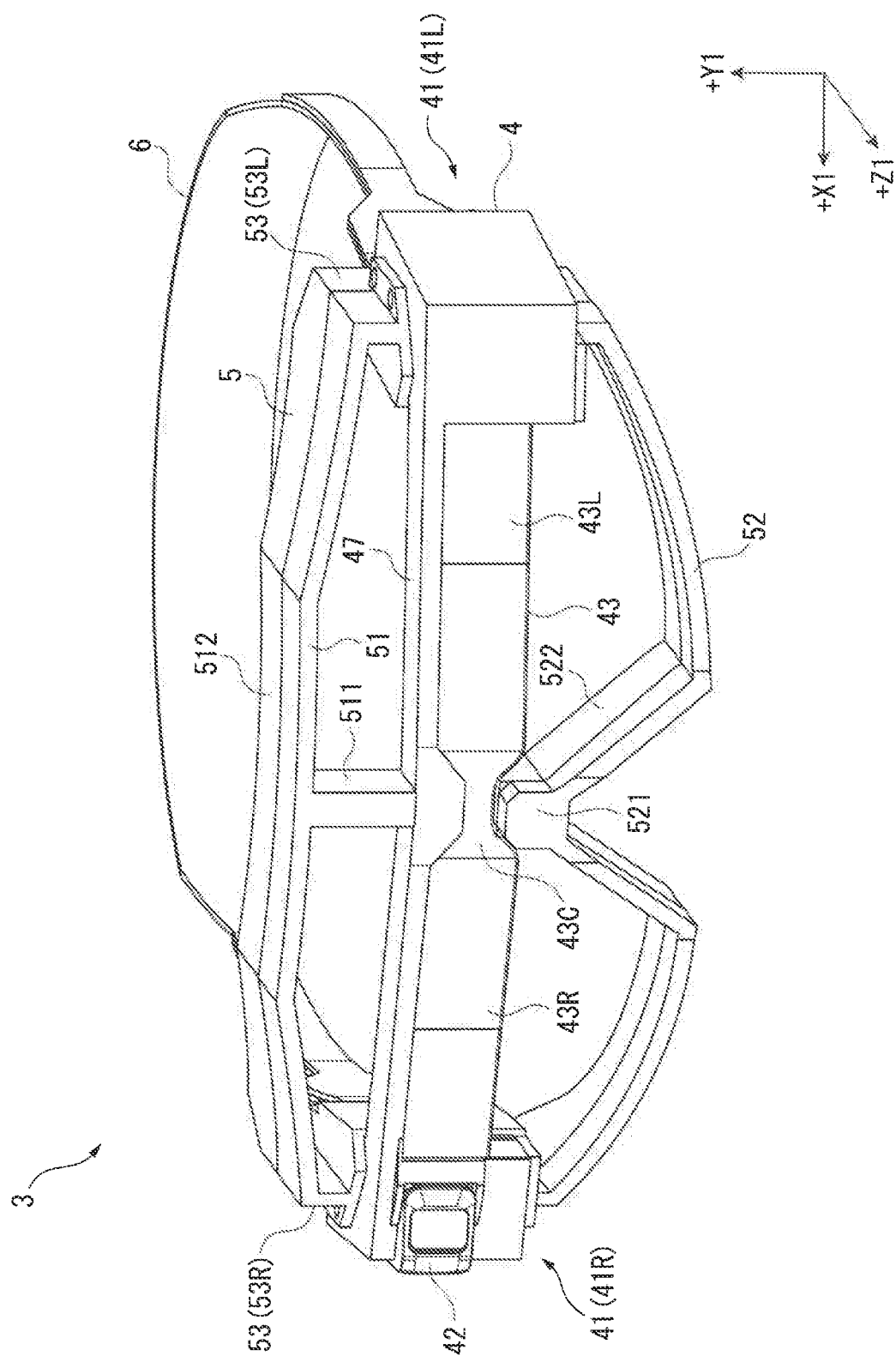
FIG. 3 is a front perspective view of a display unit of First Exemplary Embodiment.
Figure 4:
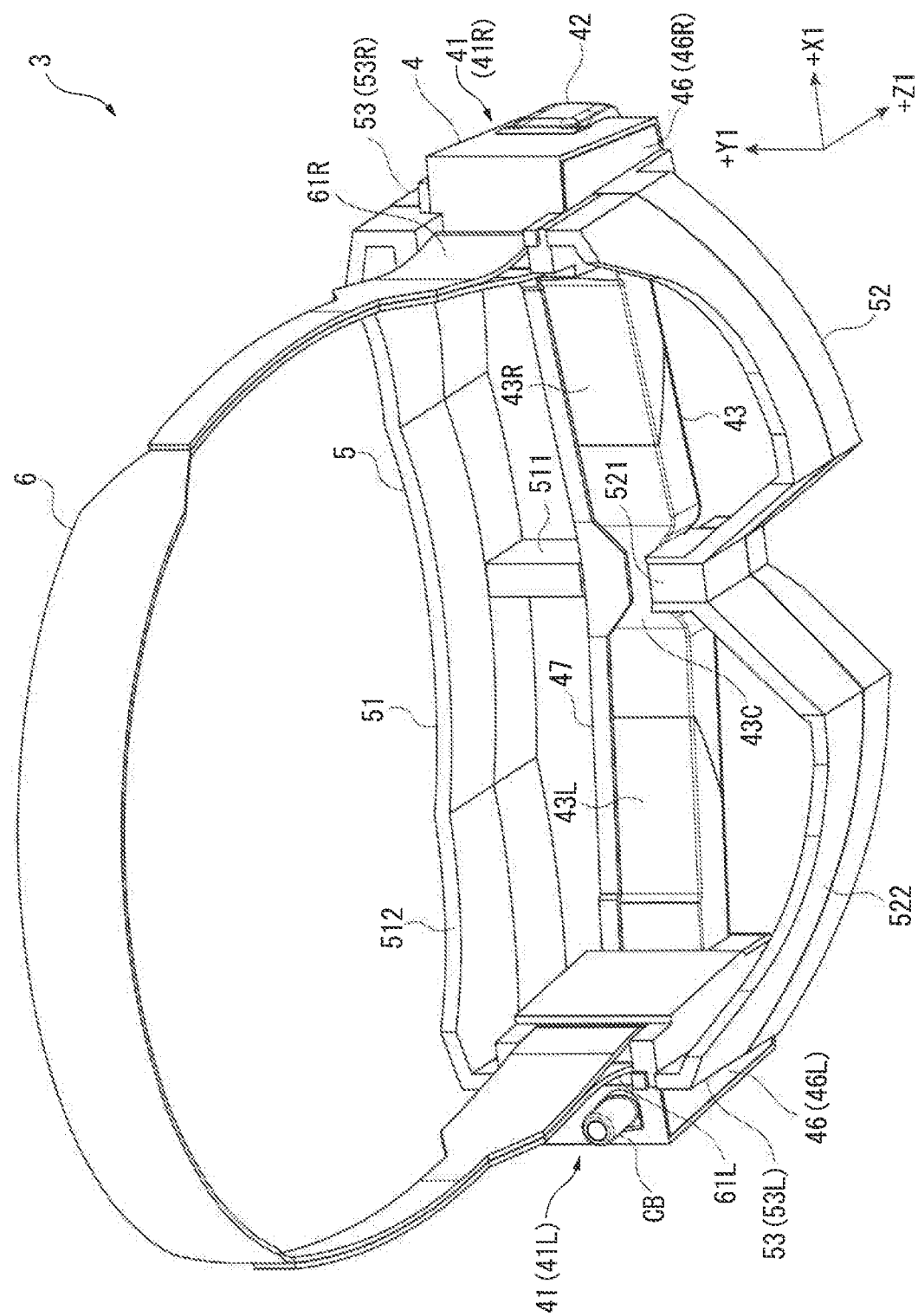
FIG. 4 is a rear perspective view of the display unit of First Exemplary Embodiment.
Figure 5:
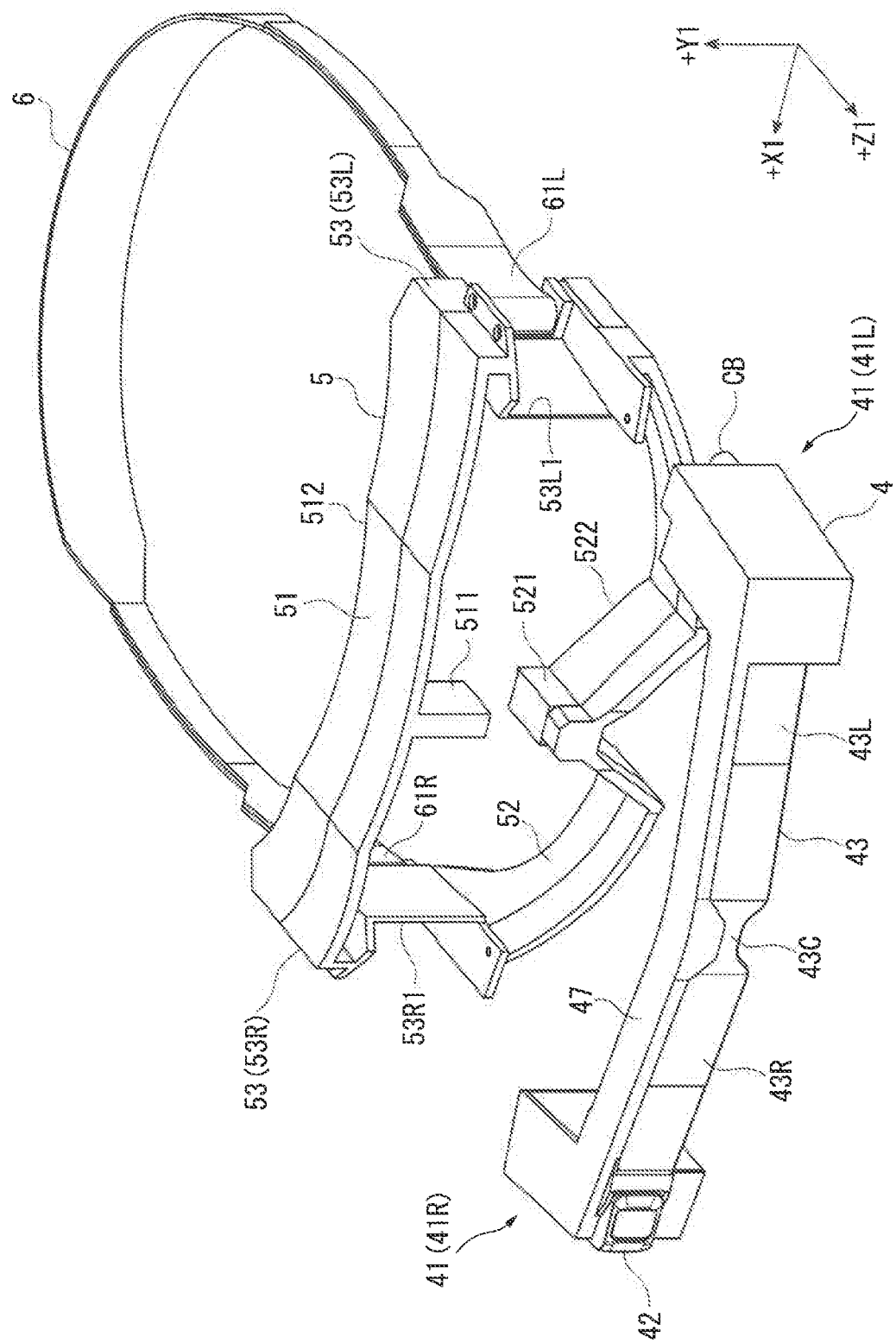
FIG. 5 is an exploded perspective view of the display unit of First Exemplary Embodiment.

FIG. 3 and FIG. 4 are perspective views of the display unit 3, when viewed from the front side and the rear side, respectively. FIG. 5 is an exploded perspective view of the display unit 3, when viewed from the front side.

The display unit 3 is to be mounted on the head of the user US separately from the face mask 2. The display unit 3 displays an image according to image information (including image signals) received from the outside via a cable CB to allow the user US to view the image. In other words, the display unit 3 is a head-mounted image display device available even as a single unit. In the state where the display unit 3 is mounted on the head HD and further the face mask 2 is worn on the head HD, as illustrated in FIG. 1 and FIG. 2, the display unit 3 is disposed within the eyepiece portion 21 of the face mask 2, that is, between the inner face of the eyepiece portion 21 and the face FC.

As illustrated in FIG. 3 to FIG. 5, that display unit 3 includes a device main body 4, the supporting member 5, and a band 6.

The display unit 3 will be described below by referring to a +X1 direction and a +Y1 direction, which are each perpendicular to the +Z1 direction and refer local coordinates for the display unit 3, as well as the +Z1 direction.

Specifically, the +Z1 direction is the line-of-sight direction of the user US and also the direction from the rear side to the front side of the display unit 3. The +X1 direction is the direction from the left side to the right side of the display unit 3, and the +Y1 direction is the direction from the lower side to the upper side of the display unit 3. The +Z1 direction, the +X1 direction, and the +Y1 direction are perpendicular to one another. The opposite direction to the +Z1 direction is referred to as a −Z1 direction, but is not illustrated. The same applies to a −X1 direction and a −Y1 direction.

In the state where the display unit 3 is mounted on the user US, the +X1 direction is parallel to the +X direction. In contrast, the +Y1 direction is a direction inclined from the +Y direction to the +Z1 direction.

Configuration of Band

The band 6 is now described.

The band 6 is a mounting member for mounting the supporting member 5 that supports the device main body 4 to be fitted on the face FC. The band 6 is made of an elastic or flexible synthetic resin material to have a substantially U shape, when viewed from above (the +Y1 direction side). When viewed from above, at the left end portion of the band 6 (the −X1 direction side), a U-shaped folded portion 61L is formed, and also at the right end portion of the band 6 (the +X1 direction side), a U-shaped folded portion 61R is formed. Of the folded portions, the folded portion 61L is attached to a left attachment portion 54L of a band attachment portion 54, which will be described later, of the supporting member 5, and the folded portion 61R is attached to a right attachment portion 54R of the band attachment portion 54.

Such a band 6 may include an adjustment mechanism for adjusting the length of the band 6. The band 6 is made of, but not limited to, a synthetic resin material, and may be made of, for example, a fabric.

Configuration of Device Main Body

Figure 6:
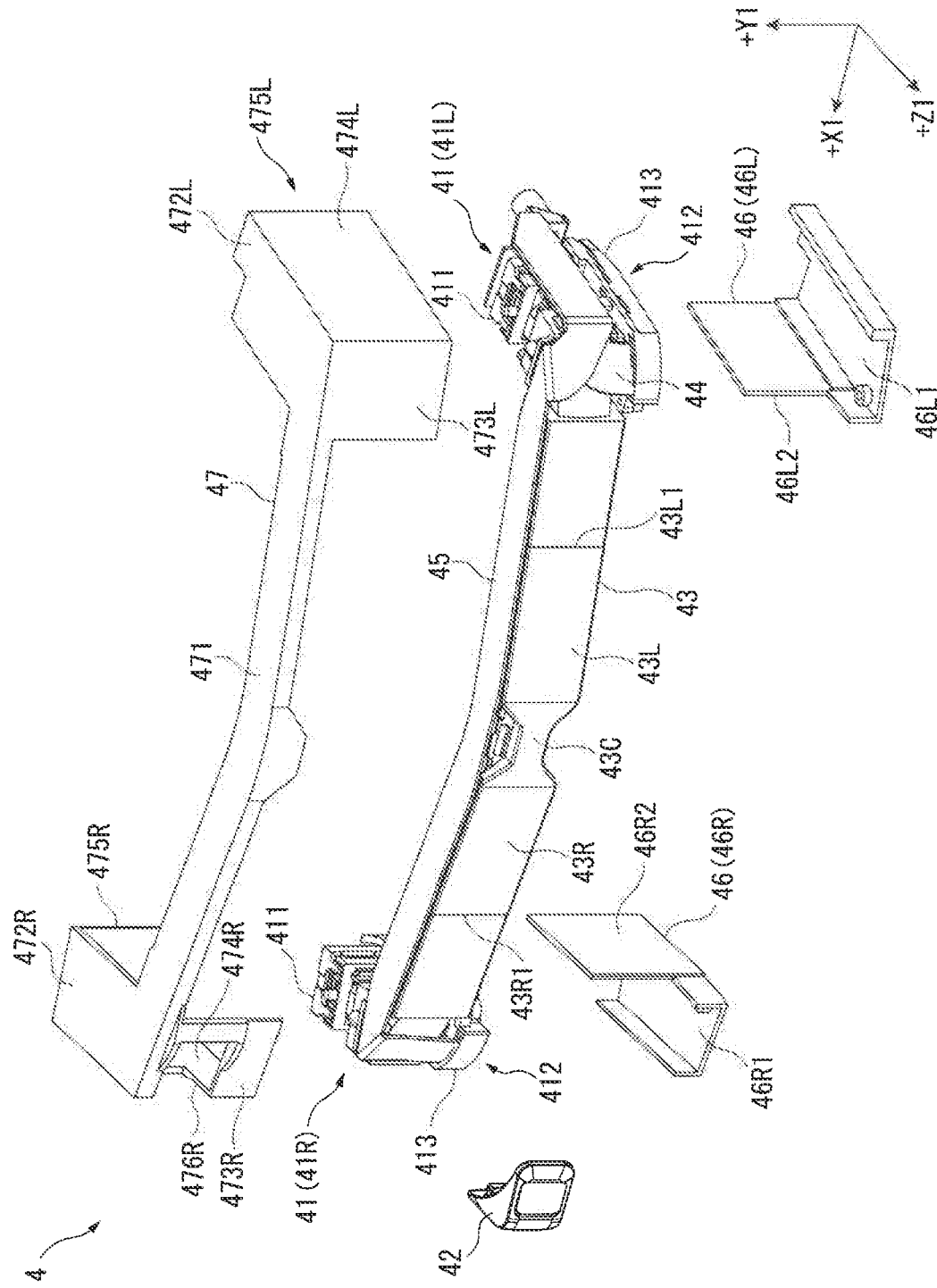
FIG. 6 is an exploded perspective view of a device main body of First Exemplary Embodiment, when viewed from the front side.
Figure 7:
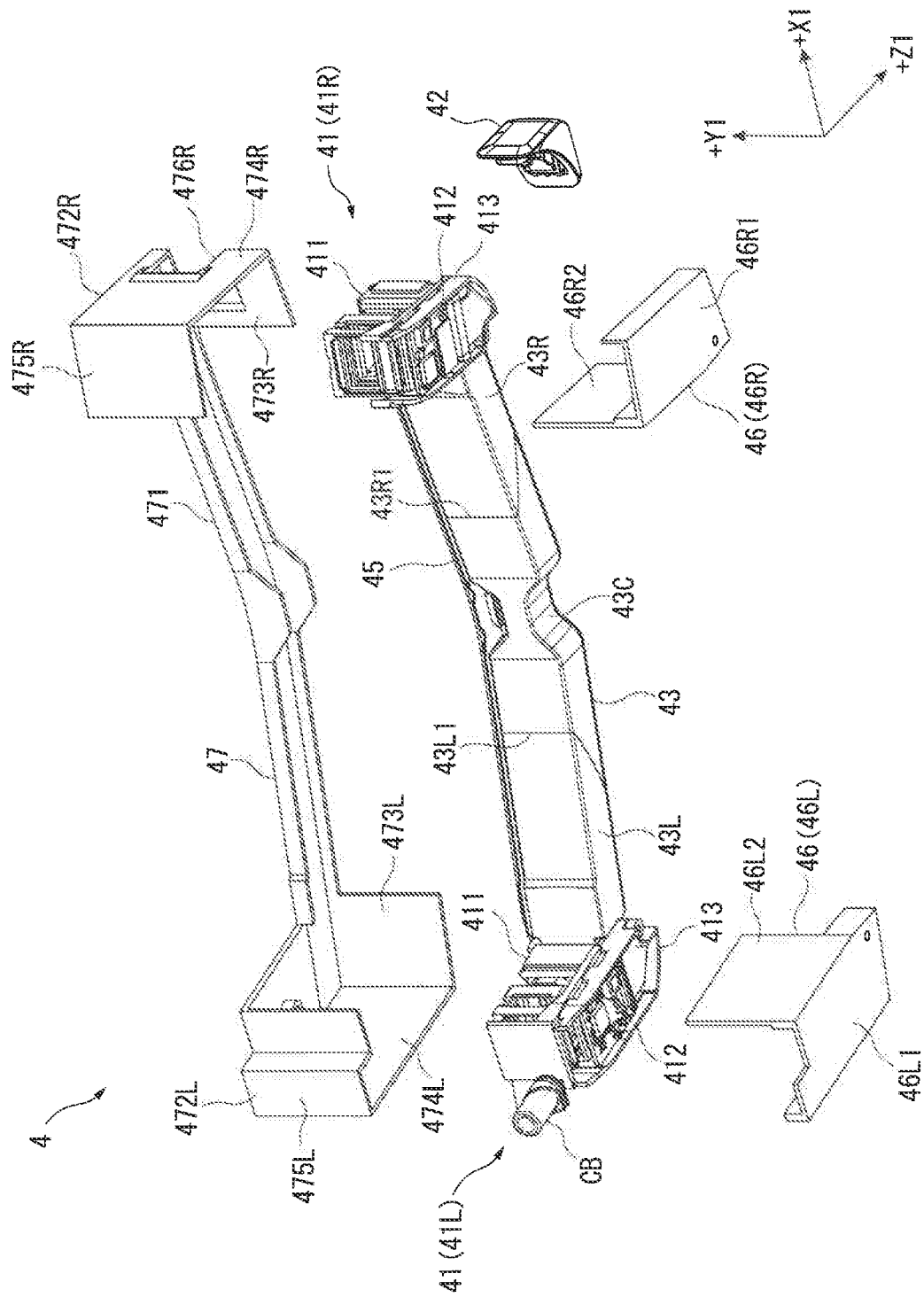
FIG. 7 is an exploded perspective view of the device main body of First Exemplary Embodiment, when viewed from the rear side.

FIG. 6 and FIG. 7 are exploded perspective views of the device main body 4, when viewed from the front side and the rear side, respectively.

The device main body 4 is disposed in front of the eyes of the user US to display the image. The device main body is supported by the supporting member 5 so that the device main body 4 is disposed along the left-and-right direction from the left temple to the right temple of the user US. As illustrated in FIG. 6 and FIG. 7, that device main body 4 includes two emission units 41, an image capturing unit 42, flexible printed circuits (FPCs) 44 and 45, two lower cover members 46, and one upper cover member 47.

Configuration of Emission Unit

Of the two emission units 41, one is a left emission unit 41L that is disposed at a position corresponding to the left temple of the user US, and the other is a right emission unit 41R that is disposed at a position corresponding to the right temple.

The left emission unit 41L and the right emission unit 41R each emit image light to the light guide member 43. The image light is light for forming an image according to the image information. Each of the emission units 41L and 41R includes a housing 411 that has a substantially quadrangular tubular shape and accommodates and holds optical components for forming the image light, a board 412 (FIG. 7), and a board supporting portion 413 that supports the board 412.

Figure 8:
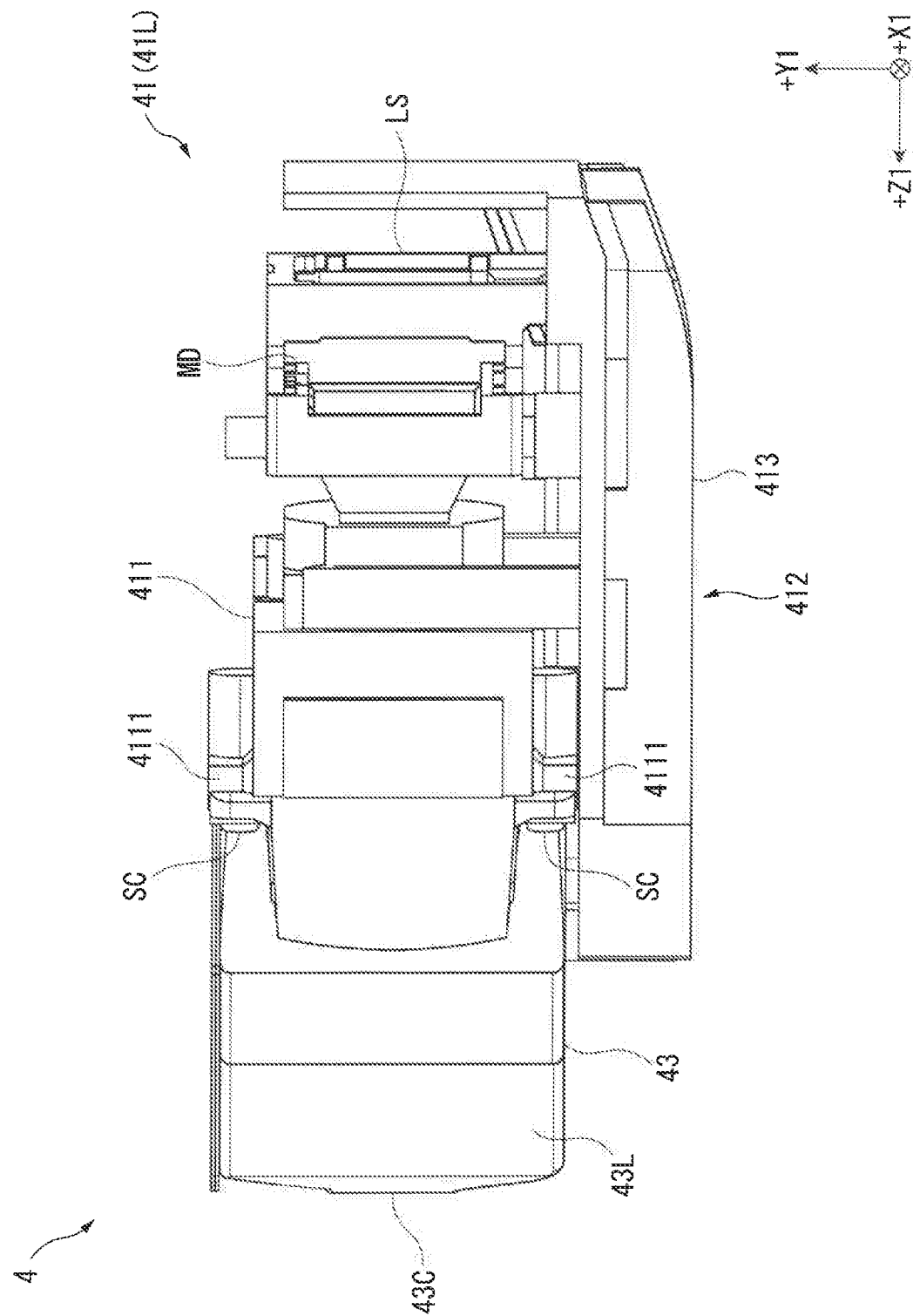
FIG. 8 is a side view of a housing, a board supporting portion, and a light guide member of First Exemplary Embodiment.

FIG. 8 is a side view of the housing 411 and the board supporting portion 413, which constitute the left emission unit 41L, and the light guide member 43, when viewed from the left side (the −X direction side).

As illustrated in FIG. 8, the optical components include, for example, a light source LS, a light modulator MD such as a liquid crystal display which modulates light emitted from the light source LS to form image light according to the image information, and at least one lens or prism (not illustrated) that projects the image light. The emission units 41 is not limited to that configuration and may include a display panel that includes a plurality of self light-emitting elements to emit the image light in place of the light source LS and the light modulator MD. Such a display panel is, for example, an organic electro-luminescence panel (EL). The light modulator MD is not limited to the crystal liquid panel, and may be another type of light modulator as long as it is configured to modulate incident light. One example of such another type is a device using a micromirror such as a digital micromirror device (DMD). In other words, each of the emission units 41L and 41R may be of any type as lone as it is configured to emit image light.

The housing 411 includes fixing portions 4111 that fix the housing 411 to the light guide member 43 at positions on the +Y1 direction side and the −Y1 direction side on the +Z1 direction side. The fixing portions 4111 each include a screw hole (not illustrated), and a screw SC is inserted into the screw hole via the light guide member 43 in the −Z1 direction and the housing 411 and the light guide member 43 are assembled.

FIG. 8 illustrates the housing 411 of the left emission units 41L, and the housing 411 of the right emission units 41R, while not illustrated, includes the fixing portions 4111.

With that configuration, image light for left eye emitted from the left emission unit 41L enters a left-eye light guide portion 43L of the light guide member 43 through an incident surface, of the light guide member 43, facing the left emission unit 41L, and image light for right eye emitted from the right emission unit 41R enters a right-eye light guide portion 43R of the light guide member 43 through an incident surface, of the light guide member 43, facing the right emission unit 41R.

The board 412 is a board on which a circuit element is mounted, and the circuit element functions as a driver that controls the light source LS and the light modulator. MD according to the image information. On the board 412 included in the right emission units 41R, a circuit element that controls the image capturing unit 42, which will be describe later, is further mounted.

As illustrated in FIG. 6 to FIG. 8, the board supporting portion 413 is located on the −Y1 direction side with respect to the housing 411 and is fixed to the housing 411. The board supporting portion 413 supports the board 412 on its surface on the −Y1 direction side.

Configuration of Image Capturing Unit

As illustrated in FIG. 6 and FIG. 7, the image capturing unit 42 is located at a position on the +Z1 direction side with respect to the right emission units 41R. The image capturing unit 42 is controlled by the board 412 included in the right emission unit 41R, and externally outputs a captured image via the FPC 45 and the cable CB.

Configuration of Light Guide Member

The light guide member 43 is disposed in front of the left and light eyes of the user US, and guides image light incident from the emission units 41L and 41R to the left eye and right eye, respectively. The light guide member 43 includes the left-eye light guide portion 43L that is located on the left side (the −X1 direction side) in the light guide member 43, the right-eye light guide portion 43R that is located on the right side (the +X1 direction side), and a joint portion 43C that is located at substantially the center of the light guide member 43 to integrate the left-eye light guide portion 431 and the right-eye light guide portion 43R.

The left-eye light guide portion 431 reflects image light for left eye incident from the left emission unit 411 at its interface to the inside to cause the image light to travel toward the central side (the +X1 direction side), then reflects the image light at a semi-transmissive layer 43L1 that is located at a position corresponding to the left eye of the user US toward the left eye side, and thus guides the image light to the left eye.

The right-eye light guide portion 43R reflects image light for right eye incident from the right emission unit 41R at its interface to the inside to cause the image light to travel toward the central side (the −X1 direction side), then reflects the image light at a semi-transmissive layer 43R1 that is located at a position corresponding to the right eye of the user US toward the right eye side, and thus guides the image light to the right eye.

The joint portion 430 connects the left-eye light guide portion 43L and the right eye light guide portion 43R to integrate the light guide portions. The substantial central portion of the joint portion 43C is formed such that the dimension in the up-and-down direction (the dimension in the +Y direction) is smaller than the dimension of the left-eye light guide portion 43L and the right-eye light guide portion 43R in the up-and-down direction. In other words, the bottom face of the joint portion 43C is formed to have a substantially inverted U shape, when viewed from the front side (the +Z1 direction side). Such a bottom face of the joint portion 43C is abuttable with a deformation restricting portion 521 of a lower extension portion 52 included in the supporting member 5, which will be described later.

Such a light guide member 43 is made of a resin material having a high light transmittance in the visible light range (e.g., cycloolefin polymer). This allows the user US to view an image according to image light for left eye and the right eye guided by the left-eye light guide portion 43L and the right-eye light guide portion 43R, respectively. In addition, the left-eye light guide portion 43L and the right-eye light guide portion 43R allow the user US to view the outside world. In other words, the display unit 3 is configured to be a see-through head-mounted image display device.

Configuration of FPC

The FPC 44 connects the cable CB that is located on the rear side (the −Z, direction side) with respect to the left emission unit 41L and the board 412 of the left emission unit 41L. The FPC 45 connects the cable CB and the board 412 of the right emission unit 41R.

The FPCs 44 and 45 transfer image information received via the cable CB to each board 412. In addition, the FPC 45 outputs an image captured by the image capturing unit 42 from the board 412 to the cable CB.

The FPC 45 is partly disposed between the light guide member 43 and the upper cover member 47, which will be described later, and the FPC 45 is thus configured to hide from the outside.

Configuration of Lower Cover Member

The two lower cover members 46 (46L, 46R) are assembled together with the upper cover member 47, and the assembled members accommodate the left emission unit 41L and the right emission unit 41R.

Of the lower cover members 46, a lower cover member 46L provided to correspond to the left emission unit 41L includes a bottom face portion 46L1 that crosses the up direction (the +Y1 direction) and a side face portion 46L2 that crosses the right direction (the +X1 direction). The lower cover member 46L is formed to have a substantially L shape formed by the above face portions to cover the lower side and the right side of the left emission unit 41L.

Likewise, a lower cover member 46R provided to correspond to the right emission unit 41R includes a bottom face portion 46R1 that crosses the up direction (the +Y1 direction) and a side face portion 46R2 that crosses the left direction (the −X1 direction). The lower cover member 46R is formed to have a substantially L shape formed by the above face portions to cover the lower side and the left side of the right emission unit 41R.

In other words, the side face portion 46L2 of the lower cover member 46L and the side face portion 46R2 of the lower cover member 46R are disposed on the head HD side of the user US with respect to the emission units 41L and 41R, respectively.

Configuration of Upper Cover Member

The upper cover member 47 is a cover member that is formed to have a substantially U shape to cover the left emission unit 41L, the right emission unit 41R, and the light guide member 43, when viewed from above (the +Y1 direction side). The upper cover member 47 includes a front portion 471 that extends along the left-and-right direction (the ±X1 direction) to cover the top face (the face on the +Y1 direction side) of the light guide member 43, and two casings 472L and 472R that are provided in both ends of the front portion 471 in the left-and-right direction.

Of the two casings 472L and 472R, the casing 472L that is located on the left side (the −X1 direction side) is assembled together with the lower cover member 46L, thus accommodating the left emission unit 41L. The casing 472L includes a side face portion 473L that is located on the front side (the +Z1 direction side) and crosses the front-and-rear direction (the ±Z1 direction), a side face portion 474L that is located on the left side (the −X1 direction side) and crosses the left-and-right direction (the ±X1 direction), and a side face portion 475L that is located on the rear side (the −Z1 direction side) and crosses the front-and-rear direction (the ±Z1 direction).

The casing 472R that is located on the right side (the +X1 direction side) is assembled together with the lower corer member 46R, thus accommodating the right emission unit 41R. The casing 472R includes a side face portion 473R that is located on the front side (the +Z1 direction side) and crosses the front-and-rear direction (the ±Z1 direction), a side face portion 474R that is located on the left side (the +X1 direction side) and crosses the left-and-right direction (the ±X1 direction), and a side face portion 475R that is located on the rear side (the −Z1 direction side) and crosses the front-and-rear direction (the ±Z1 direction).

The casing 472R includes an opening 476R defined by the side face portion 473R and the side face portion 474R. A part of the image capturing unit 42 is exposed to the outside through the opening 476R.

Configuration of Supporting Member

Figure 9:
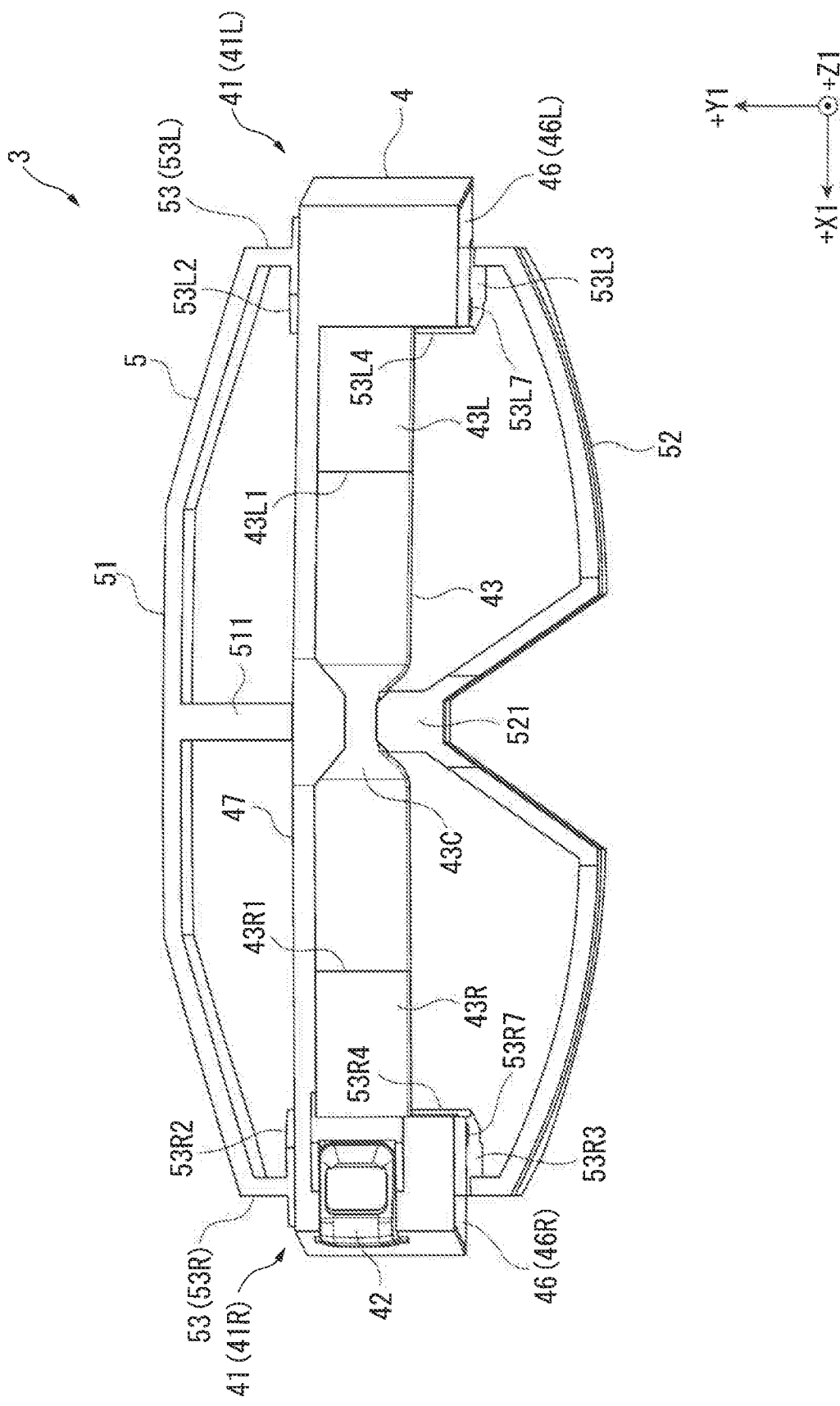
FIG. 9 is a front view of a supporting member supporting the device main body of First Exemplary Embodiment.
Figure 10:
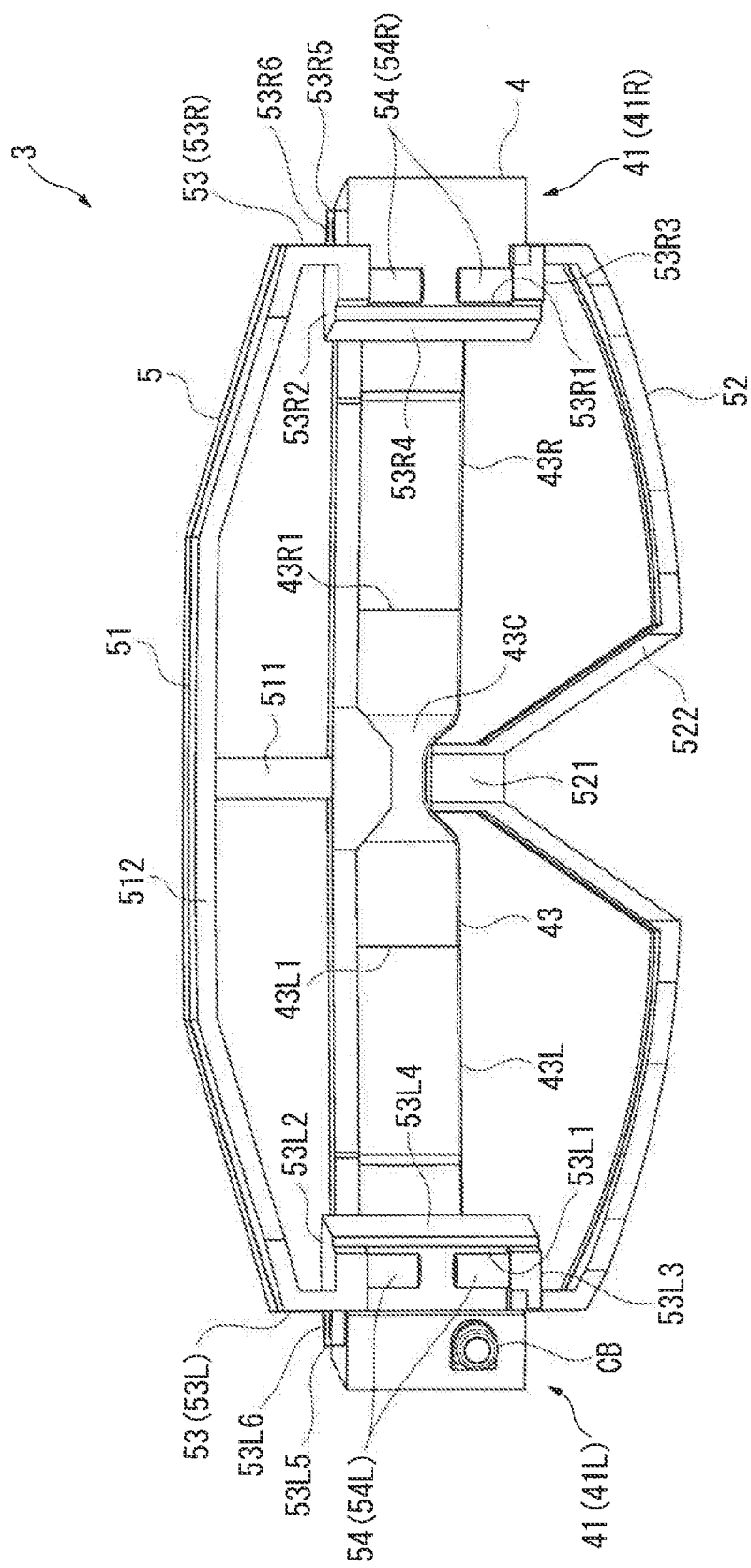
FIG. 10 is a rear view of the supporting member supporting the device main body of First Exemplary Embodiment.
Figure 11:
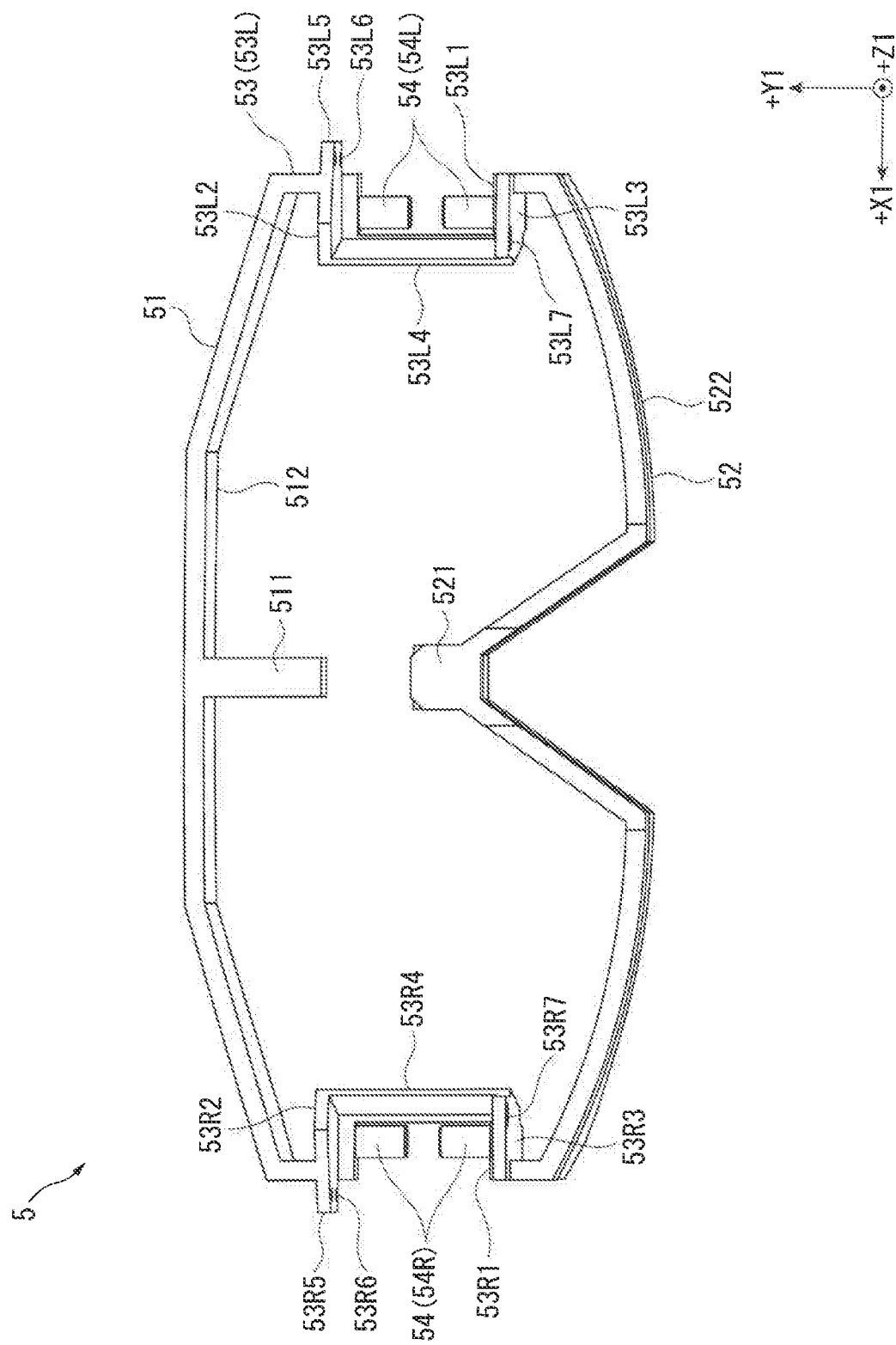
FIG. 11 is a front view of the supporting member of First Exemplary Embodiment.
Figure 12:
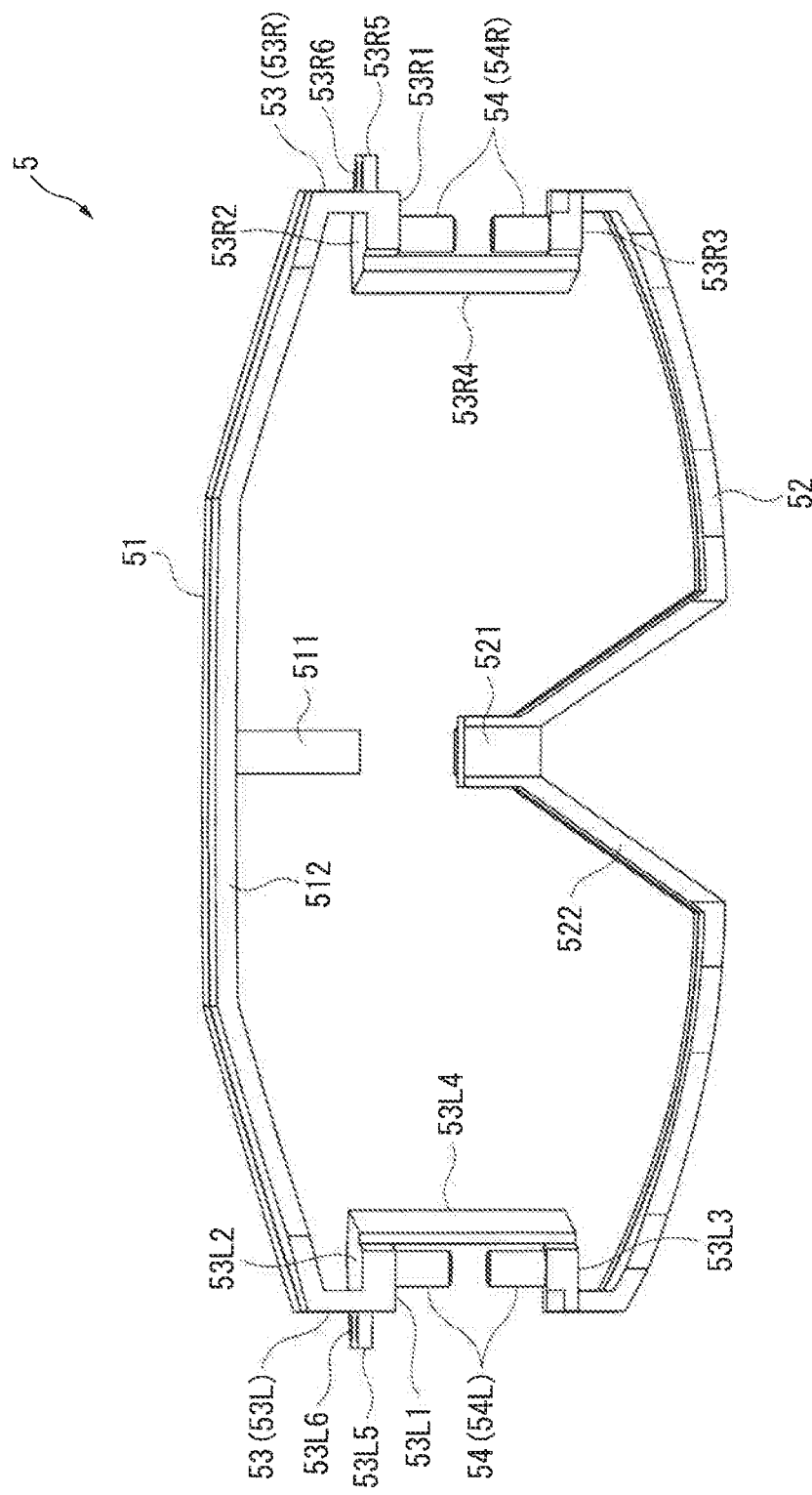
FIG. 12 is a rear view of the supporting member of First Exemplary Embodiment.

FIG. 9 and FIG. 10 are a front view (a view when viewed from the +Z1 direction side) and a rear view (a view when viewed from the −Z1 direction side) of the supporting member 5 while supporting the device main body 4, respectively. FIG. 11 and FIG. 12 are a front view and a rear view of the supporting member 5 while not supporting the device main body 4.

As illustrated in FIG. 1 to FIG. 4, the supporting member 5 supports the device main body 4 and is mounted on the head HD by the band 6, thus disposing the light guide member 43 in front of the eyes of the user US. As illustrated in FIG. 9 to FIG. 12, the supporting member 5 is made of a resin or another material to have a frame shape of, for example, goggles (ski and snowboard goggles) worn on the face FC.

Such a supporting member 5 includes an upper extension portion 51, the lower extension portion 52, a coupling portion 53, and the band attachment portion 54.

Configuration of Upper Extension Portion and Lower Extension Portion

The upper extension portion 51 and the lower extension portion 52 extend in the left-and-right direction (the ±X1 direction) and are located on the upper side (the +Y1 direction side) and the lower side (the −Y1 direction side) with respect to the light guide member 43, respectively, so that the light guide member 43 is interposed between the extension portions.

The upper extension portion 51, which is located on the upper side with respect to the light guide member 43, has a substantially M shape (a substantially inverted W shape), when viewed from the front side (the +Z1 direction side), and comes in abutment with the face FC (in particular, the forehead) of the user US. The dimension of the upper extension portion 51 in the left-and-right direction (the dimension in the ±X1 direction) is substantially equal to the dimension. of the light guide member 43 in the left-and-right direction. That upper extension portion 51 includes a deformation restricting portion 511 that protrudes downward (to the −Y1 direction) and has a substantially quadrangular prism shape, at the center in the left-and right direction. The downward direction (the −Y direction) is a direction approaching the device main body 4.

When the upper extension portion 51 is deformed downward by an impact or the like, the deformation restricting portion 511 comes in abutment with the top face (the face on the +Y1 direction side) of the front portion 471 of the upper cover member 47, thus restricting the deformation of the upper extension portion 51. In First Exemplary Embodiment, the deformation restricting portion 511 is disposed so that a space is provided between the upper cover member 47 and the deformation restricting portion 511 in the up-and-down direction. However, the deformation restricting portion 511, not limited to that arrangement, may be in contact with the upper cover member 47 beforehand.

The lower extension portion 52, which is located on the lower side with respect to the light guide member 43, has a substantially inverted W shape, when viewed from the front side, and comes in abutment with the face FC (in particular, the cheek) of the user US. The dimension of the lower extension portion 52 in the left-and-right direction is substantially equal to the dimension of the light guide member 43 in the left-and-right direction. A substantially central portion of the lower extension portion 52 in the left-and-right direction is formed to have an inverted Y shape, when viewed from the front side. In a state where the lower extension portion 52 is in abutment with the face FC, the nose of the user US is located within the inverted V-shaped portion of the inverted Y-shaped portion.

That lower e tension portion 52 includes the deformation restricting portion 521 that protrudes upward (to the +Y1 direction side), i.e., to the direction approaching the device main body 4 and has a substantially quadrangular prism shape, at the center in the left-and right direction.

The deformation restricting portion 521 functions in the same way as the deformation restricting portion 511.

Specifically, when the lower extension portion 52 is deformed upward by an impact or the like, the deformation restricting portion 521 comes in abutment with the joint portion 430 of the light guide member 43, thus restricting the deformation. of the lower extension portion 52. In First Exemplary Embodiment, the deformation restricting portion 521 is disposed to provide a space between the joint portion 430 and the deformation restricting portion 521 in the up-and-down direction. However, the deformation restricting portion 521, not limited to that arrangement, may be in contact with the joint portion 430 beforehand.

Figure 13:
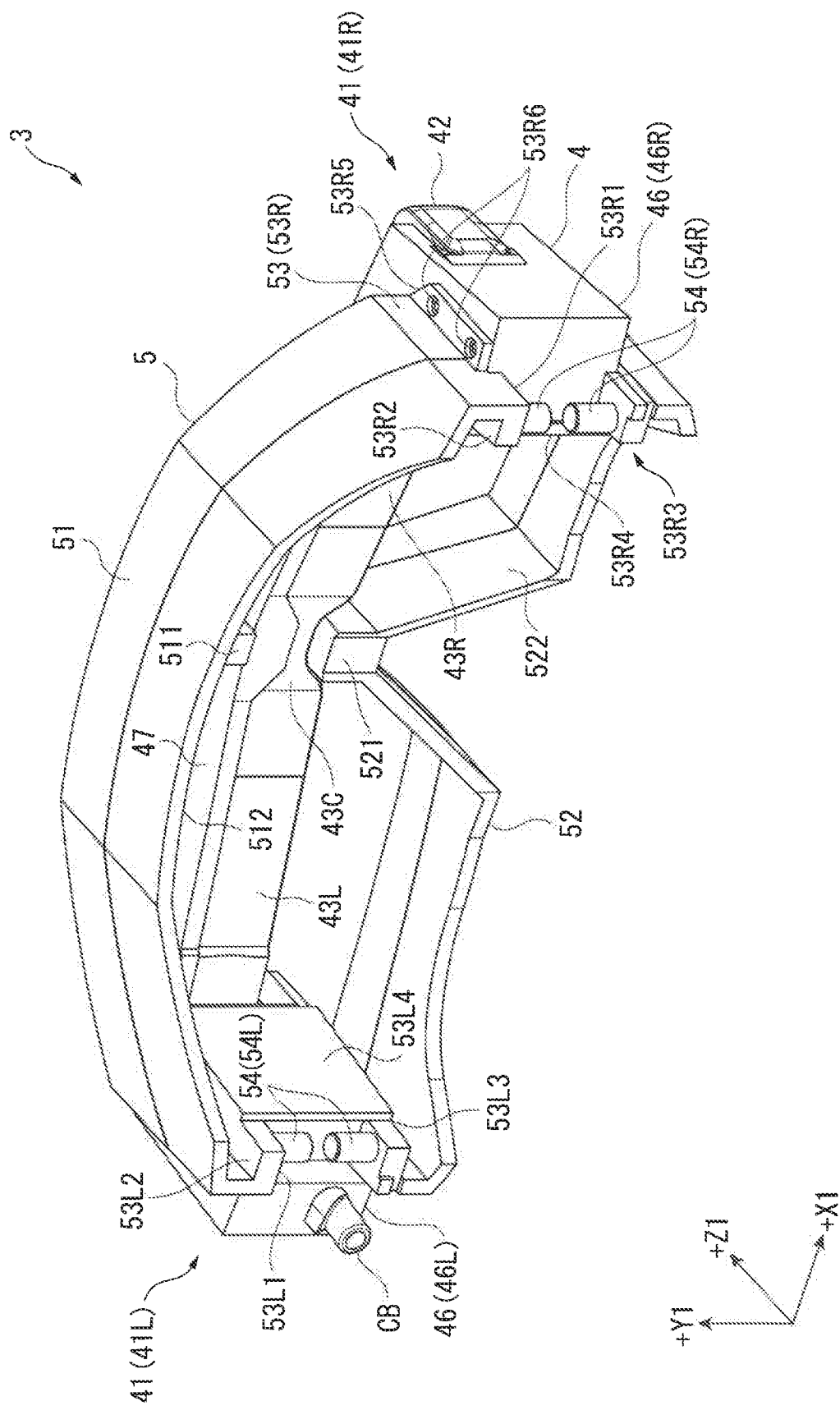
FIG. 13 is a rear perspective view of the device main body and the supporting member of First Exemplary Embodiment.

FIG. 13 is a perspective view of the device main body 4 and the supporting member 5, when viewed from the rear side and above.

As illustrated in FIG. 13, the upper extension portion 51 and the lower extension portion 52 includes abutment portions 512 and 522 that come in abutment with the face FC of the user US, at positions facing the user US on the rear side (the −Z1 direction side), respectively. The abutment portions 512 and 522 are each made of an elastic material, such as a rubber and a resin, and have a curved shape such that contact portions 512 and 522 protrude further as approaching its left end (the −X1 direction side) and right end (the +X1 direction side). In other words, the abutment portions 512 and 522 have a shape conforming to the shape of the face FC facing the abutment portions 512 and 522. That shape makes it easy to fit the abutment portions 512 and 522 on the face PC, thus making it easy to arrange the device main body 4 supported by the sup porting member 5 in front of the eyes of the user US.

As illustrated in FIG. 2, since the face mask 2 has a substantially semi-spherical shape, the dimension between the deformation restricting portion 521 and the inner face of the face mask 2 in the front-and-rear direction (the ±Z1 direction) is larger than the dimension between the deformation restricting portion 511 and the inner face of the face mask 2 in the front-and-rear direction. The lower extension portion 52 (the abutment portion 522) also functions as a nose pad that comes in abutment with the nose of the user US. Accordingly, a dimension of the lower extension portion 52 in the front-and-rear direction is larger than the dimension of the upper extension portion 51, and makes the supporting member 5 stable with respect to the face FC. In this respect, in First Exemplary Embodiment as illustrated in FIG. 2, the deformation restricting portion 521 protrudes more on the front side (the +Z1 direction side) than the deformation restricting portion 511.

However, in a case where the supporting member 5 fits on the face FC, a degree of tightening the band 6, the lower extension portion 52 may not be configured to have the structure that comes in abutment with the nose of the user US. Furthermore, in a case where the display unit 3 has a nose-pad-like structure that comes in abutment with the nose, the lower extension portion 52 or the device main body 4 may be configured to have such a structure.

Configuration of Coupling Portion

As illustrated in FIG. 9 to FIG. 13, the coupling portion 53 includes a left coupling portion 531, that is located on the left side (the −X1 direction side) in the supporting member 5, and a right coupling portion 53R that is located on the right side (the +X1 direction side), and the coupling portions couple the upper extension portion 51 and the lower extension portion 52, and as illustrated in FIG. 9, FIG. 10, and FIG. 13, the coupling portions are to be fixed by the device main body 4.

As illustrated in FIG. 10 to FIG. 12, the left coupling portion 53L includes a concave portion 53L1 having a concave shape (a substantially U shape) that is concave to the right side (the +X1 direction side) , and the concave portion 53L1 is open on the left side, the front side (the +Z1 direction side), and the rear side (the −Z1 direction side). Specifically, the concave portion 53L1 includes two side face portions 53L2 and 53L3 that face each other in the up-and-down direction, and a side face portion 53L4 that couples the right ends of the side face portions 53L2 and 53L3, and the side face portions 53L2 to 53L4 couple the extension portions 51 and 52.

In such a concave portion 53L1, a left projector that includes the left emission unit 41L, the lower cover member 46L, and the casing 472L of the upper cover member 47 is disposed. In other words, the concave portion 53L1 is a location where left projector (the left emission unit 41L) is disposed in the supporting member 5.

The left coupling portion 531 includes a protruding portion 53L5 that protrudes leftward, in an upper portion with respect to the concave portion 53L1. The protruding portion 53L5 has holes 53L6 into which screws (not illustrated) are inserted from above to secure the casing 472L (also the left emission unit 41L) disposed in the concave portion 53L1.

In addition, as illustrated in FIG. 9 and FIG. 11, the side face portion 53L3 has a hole 53L7 into which a screw (not illustrated) is inserted from below to secure the lower cover member 46L (also the left emission unit 41L).

The holes 53L6 and 53L7 are fixing portions that fix the device main body 4 (the left emission unit 41L).

The right coupling portion 53R and the left coupling portion 53L are mirror symmetrical. Specifically, as illustrated in FIG. 10 to FIG. 12, the right coupling portion 53R includes a concave portion 53R1 that is a location where a right projector which includes the right emission unit 41R, the lower cover member 46R, and the casing 472R of the upper cover member 47 is disposed. As with the concave portion 53L1, the concave portion 53R1 includes two side face portions 53R2 and 53R3 that face each other in the up-and-down direction, and a side face portion 53R4 that couples the left ends of the side face portions 53R2 and 53R3.

In addition, the right coupling portion 53R includes a protruding portion 53R5 that has holes 53R6 into which screws (not illustrated) are inserted from above to secure the casing 472R (also the right emission unit 41R). As illustrated in FIG. 9 and FIG. 11, the side face portion 53R3 has a hole 53R7 into which a screw (not illustrated) is inserted from below to secure the lower cover member 46R (also the right emission unit 41R).

The holes 53R6 and 53LR are fixing portions that fix the device main body 4 (the right emission unit 41R).

Configuration of Band Attachment Portion

The band attachment portion 54 is a portion to which the folded portions 61L and 61R of the hand 6 are attached and to which the band 6 is thus attached. The band attachment portion 54 includes the left attachment portion 54L that is located on the left side in the supporting member 5 and the right attachment portion 54R that is located on the right side, and the attachment portions 54L and 54R are also disposed on the rear side with respect to the projectors (the emission units 41R and 41L) disposed in the concave portions 53L1 and 53R1.

Specifically, as illustrated in FIG. 10, the left attachment portion 54L is located closer to the head HD (to the right) than the left end of the device main body 4 supported by the supporting member 5 (on the −X1 direction side). The left attachment portion 54L includes two cylindrical portions that protrude from the side face portions 53L2 and 53L3 toward the directions opposite to each other.

The right attachment portion 54R is located closer to the head HD (to the left) than the right end of the device main body 4 supported by the supporting member 5 (on the +X1 direction side). A with the left attachment portion 54L, the right attachment portion 54R includes two cylindrical portions that protrude from the side face portions 53R2 and 53R3 toward the directions opposite to each other.

Accordingly, the folded portion 61L of the band 6 is attached to the left attachment portion 54L (refer to FIG. 4), the folded portion 61R is attached to the right attachment portion 54R (refer to FIG. 4), and the band 6 is thus attached to the supporting member 5.

As illustrated in FIG. 2, when worn on the head HD of the user US, the band 6 attached to the band attachment portion 54 is disposed along the head HD while abutting with the head HD. Accordingly, when the display unit 3 including the band 6 is mounted on the head HD and then the face mask 2 is worn on the head HD (the face FC), the band 6 is located between the head HD and the face mask 2. This arrangement enables the band 6 to be located at a suitable position along the head HD, as compared to the case where the band 6 is worn on the head HD from the exterior of the face mask 2 (e.g., the extension portion 22), that the case where a part of the face mask 2 is located between the surface of the head HD and the band 6. Therefore, the display unit 3 functioning as a head-mounted image display device is suitably mounted on the head HD.

Advantages of First Exemplary Embodiment

The face mask unit 1 according to First Exemplary Embodiment described above has the following advantages.

The display unit 3 includes the device main body 4 and the supporting member 5, and the device main body 4 includes the emission unit 41 configured to emit an image and the light guide member 43 extending along the left-and-right direction to guide the image emitted from the emission unit 41 to the eyes of the user US. The supporting member 5 extends along the left-and-right direction and includes upper extension portion 51 and the lower extension portion 52 between which the light guide member 43 is interposed in the up-and-down direction. The upper extension portion 51 and the lower extension portion 52 include the deformation restricting portions 511 and 521, each protruding toward a direction closer to the main body device 4 to restrict the deformation of the supporting member 5, respectively.

Accordingly, when a stress in the up-and-down direction is applied to the supporting member 5, the deformation restricting portions 511 and 521 resist the stress, thus restricting a deformation of the supporting member 5. This eliminates the need to additionally use a component or structure for enhancing the rigidity of the supporting member 5. Therefore, the highly-rigid, small-sized supporting member 5 is provided, and thus the display unit 3 functioning as a head-mounted image display device is downsized.

In addition, the device main body 4 and the supporting member 5 are disposed between the face FC of the user US and the face mask 2, which allows the user US to view an image displayed by the device main body 4 even in the state where the user US wears the face mask 2. Therefore, the general versatility of the face mask unit 1 is enhanced.

When the stress is applied to the supporting member 5, the deformation restricting portion 511 comes in abutment with the upper cover member 47 of the device main body 4 to restrict the deformation of the supporting member 5, and also the deformation restricting portion 521 comes in abutment with the joint portion 430 of the light guide member 43 to restrict the deformation of the supporting member 5. With that configuration, the deformation restricting portions 511 and 521 resist the stress, thus surely restricting the deformation of the supporting member 5. Therefore, the display unit 3 is surely downsized.

The light guide member 43 includes the left-eye light guide portion 43L disposed to face the left eye of the user US, the right-eye light guide portion 43R disposed to face the right eye of the user US, and the joint portion 43C that integrates the left-eye light guide portion 43L and the right-eye light guide portion 43R. With that configuration, the rigidity of the light guide member 43 is enhanced, and thus the rigidity of the device main body 4 is also enhanced. This eliminates the need for additionally providing a component for enhancing the rigidity of the device main body 4, and thus not only the device main body 4 but also the display unit 3 is downsized.

The light guide member 43 includes the left-eye light guide portion 43L and the right-eye light guide portion 43R. The device main body 4 includes the upper cover member 47, which is a cover member that covers the upper portions of the left-eye light guide portion 43L and the right-eye light guide portion 43R. With that configuration, the light guide portions 43L and 43R are protected by the upper cover member 47.

The emission units 41 (41L, 42R) each include optical components for forming an image (the light source LS, the light modulator MD, a lens, and the like) and the housing 411 that accommodates and holds the optical components, and the emission units 41 are attached to the light guide member 43. With that configuration, it is easy to position the relative positions of the emission units 41 and the light guide member 43. Therefore, the image is surely guided to the eyes of the user US by the light guide member 43, and thus the reliability of the display unit 3 is enhanced.

The supporting member 5 includes the coupling potions 53 (53L, 53R) located at both ends in the left-and-right direction and coupling the upper extension portion 51 and the lower extension portion 52, and the device main body 4 is fixed to the coupling potions 53. With that configuration, the device main body 4 is held by the supporting member 5 at the coupling portions 53, which are located at both ends of the supporting member 5 in the left-and-right direction. Thus, the device main body 4 is stably supported by the supporting member 5 and also the display unit 3 is stably mounted on the head HD.

The display unit 3 includes the band 6 that extends along the head HD. The supporting member 5 is located on the rear side with respect to the emission units (the left emission unit 41L and the right emission unit 41R), and includes the band attachment portions 54, to which the folded portions 61L and 61R, which are located at the ends of the band 6, are attached. With that configuration, the supporting member 5, which supports the device main body 4, is mounted on the head HD by the band 6. Thus, the device main body 4 is disposed at a suitable position. Moreover, the band attachment portions 54 are located on the rear side with respect to the emission units 41, thus preventing the emission units 41 from interfering with the band 6. Accordingly, fitting of the band 6 on the head facilitated. Therefore, a wearing feel of the display unit 3 is enhanced. Moreover, the band 6 extends between the face mask 2 and the face FC, thus preventing a space between the face mask 2 and the head HD from be formed.

The band attachment portion 54 includes the left attachment portion 54L that is located on the left side in the supporting member 5 and the right attachment portion 54R that is located on the right side. Of the attachment portions, the left attachment portion 54L is located closer to the head HD (to the right) than the left end of the device main body 4, and the right attachment portion 54R is located closer to the head HD (to the left) than the right end of the device main body 4. With that configuration, as compared to the case where the left attachment portion 54L is disposed closer to the left side than the left end of the device main body 4 or the case where the right attachment portion 54R is disposed closer to the right side than the right end of the device main body 4, it is easy to fit the band 6 on the head HD of the user US. Therefore, a wearing feel of the supporting member 5 and the display unit 3 is enhanced. In addition, the band 6, which is located between the head HD and the face mask 2, prevents an increase in the space between the head HD and the face mask 2.

Second Exemplary Embodiment

Next, Second Exemplary Embodiment of the disclosure will be described. A face mask unit according to Second Exemplary Embodiment has almost the same configuration as the face mask unit 1. The display unit 3, which functions as a head-mounted image display device, included in the face mask unit 1 has such a configuration that the device main body 4 is fixed by the coupling portions 53L and 53R, which are located at the left and right ends of the supporting member 5. In contrast, the face mask unit according to Second Exemplary Embodiment has such a configuration that in a display unit, a device main body is fixed at a substantially center of the supporting member. In this respect, the face mask unit according to Second Exemplary Embodiment differs from the face mask unit 1. In the following description, like references refer to the same or substantially the same elements described above, and their description will not be elaborated upon.

Configuration of Face Mask Unit

Figure 14:
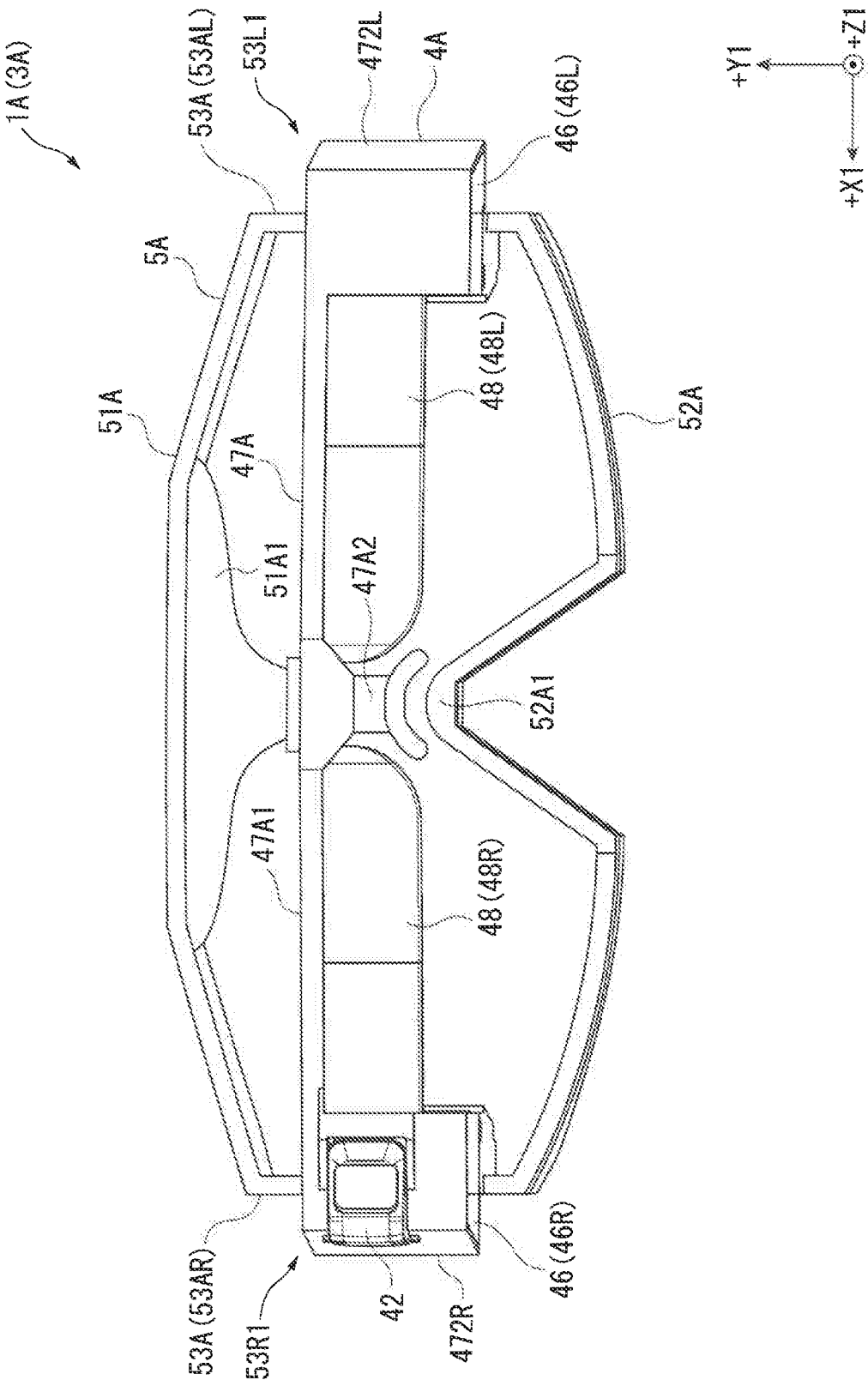
FIG. 14 is a front view of a display unit of a face mask unit according to Second Exemplary Embodiment of the disclosure.

FIG. 14 is a front view of a display unit 3A included in a face mask unit 1A according to Second Exemplary Embodiment.

The face mask unit 1A according to Second Exemplary Embodiment has almost the same configuration and functions as the face mask unit 1, except that the display unit 3 is replaced with the display unit 3A. In other words, the face mask unit 1A includes the face mask 2 (refer to FIG. 1 and FIG. 2) and the display unit 3A. As illustrated in FIG. 14, the display unit 3A includes a device main body 4A, a supporting member 5A, and the band 6 (not illustrated).

Configuration of Device Main Body

The device main body 4A has almost the same configuration and functions as the device main body 4, except that the light guide member 43 and the upper cover member 47 are replaced with a light guide member 48 and a frame member 47A.

The light guide member 43 described above is an integrated component that includes the left-eye light guide portion 43L, the right-eye light guide portion 43R, and the joint portion 43C. In contrast, the light guide member 48 includes a left-eye light guide portion 48L that is disposed in front of the left eye of the user US and a right-eye light guide portion 48R that is disposed in front of the right eye of the user US. In other words, in Second Exemplary Embodiment, the left-eye light guide portion 48L that guides image light for left eye emitted from the left emission unit 41L to the left eye and the right-eye light guide portion 48R that guides image light for right eye emitted from the left emission unit 41L to the right eye are separately configured.

The left-eye light guide portion 48L and the right-eye light guide portion 48R have the same functions as the left-eye light guide portion 43L and the right-eye light guide portion 43R described above, respectively.

As with the upper cover member 47, the frame member 47A extends along the left-and-right direction (the ±X1 direction), is assembled together with the lower cover member 46L and the lower cover member 46R, and the assembled members accommodate the left emission unit 41L and the right emission unit 41R. In other words, the frame member 47A supports the left emission unit 41L and the left-eye light guide portion 48L, and also supports the right emission unit 41R and the right-eye light guide portion 48R. The frame member 47A has almost the same configuration as the upper cover member 47, except that the front portion 471 is replaced with a front portion 47A1.

As with the front portion 471, the front portion 47A1 covers the top faces (the faces on the +Y1 direction side) of the light guide portions 48L and 48R. In other words, the frame member 47A also functions as a cover member that covers a part of the light guide portions 48L and 48R. The front portion 47A1 includes a protruding portion 47A2 that protrudes downward (to the −Y1 direction side) between the light guide portions 48L and 48R.

The protruding portion 47A2 functions as a nose pad that comes in abutment with the nose of the user US. The protruding portion 47A2 is configured to be attached to the frame member 47A when inserted from below (the −Y1 direction side) into the frame member 47A and to be detached from the frame member 47A when pulled down. The protruding portion 47A2 has an inverted U shape when viewed from the front side (the +Z1 direction side), and is abuttable with a deformation restricting portion 52A1 of a lower extension portion 52A.

As described above, in a case where the supporting member 5A fits on the pace FC, a degree of tightening the band 6, the protruding portion 47A2 may not function as a nose pad.

Configuration of Supporting Member

As with the supporting member 5, the supporting member 5A is mounted on the head HD by the band 6 while supporting the device main body 4A. Thus, the light guide portions 48L and 48R are disposed in front of the left eve and the right eve of the user US, respectively. The supporting member 5A includes an upper extension portion 51A, the lower extension portion 52A, a coupling portion 53A, and the band attachment portion 54 described above, but is not illustrated.

Of these portions, the coupling portions 53A, as with the coupling portions 53, couple the upper extension portion 51A and the lower extension portion 52A at both ends of the supporting member 5A in the left-and-right direction. The coupling portions 53A include a left coupling portion 53AL that is located on the left side in the supporting member 5A and the right coupling portion 53AR that is located on the right side.

The left coupling portion 53AL includes a concave portion 53L1 in which the left projector (the left emission unit 41L, the lower cover member 46L, and the casing 472L of the frame member 47A) is disposed. The right coupling portion 53AR includes a concave portion 53R1 in which the right projector (the right emission unit 41R, the lower cover member 46R, and the casing 472R of the frame member 47A) is disposed.

On the other hand, the coupling portions 53AL and 53AR do not include the respective protruding portions 53L5 and 53R5, and do not also have the respective holes 53L7 and 53R7. Thus, the coupling portions 53AL and 53AR do not function to fix the left emission unit 41L and the right emission unit 41R, respectively. In addition, the left coupling portion 53AL does not come in contact with the left projector, and the right coupling portion 53AR does not come in contact with the right projector.

The upper extension portion 51A extends in the left-and-right direction (the ±X1 direction), and is coupled with the lower extension portion 52A at the both ends in the left-and-right direction by the coupling portions 53AL and 53AR. The upper extension portion 51A includes a connection portion 51A1, in place of the deformation restricting portion 511, at the center of the upper extension portion 51A in the left-and-right direction. The connection portion 51A1 is connected to a portion of the device main body 4A between the light guide portions 48L and 48R. More specifically, the connection portion 51A1 is connected to a suitable portion of the top face (the +Y1 direction side) between the light guide portions 48L and 48R. In other words, the connection portion 51A1 is connected to suspend a central portion of the device main body 4A in the left-and-right direction.

In this way, in Second Exemplary Embodiment, the device main body 4A is configured to be supported by the upper extension portion 51A of the supporting member 5A. The left coupling portion 53AL does not come in contact with the left projector, and the right coupling portion 53AR does not come in contact with the right projector. In such a configuration, even when a stress to the rear side (the −Z1 direction side) is applied to the left coupling portion 53AL and the right coupling portion 53AR provided with the band attachment portion 54 by, for example, the band 6 being tightened, the coupling portions 53AL and 53AR do not interfere with the device main body 4A. The device main body 4A is prevented from being subjected to the stress. Thus, the device main body 4A (e.g., the left emission unit 41L and the right emission unit 41R) is prevented from shifting. Accordingly, the display position of the image guided by the light guide portions 48L and 48R is prevented from varying.

The left coupling portion 53AL and the right coupling portion 53AR may be configured to come in abutment with the left projector and the right projector, respectively, when a stress is applied to the rear side shift and the coupling portions is deformed toward the rear side. In this case, although the stress is applied to the device main body 4A, the device main body 4A prevents the left coupling portion 53AL and the right coupling portion 53AR from being shifted and deformed.

Any one of the upper extension portion 51A and the device main body 4A, which are connected to each other through the connection portion 51A1, may include an adjuster configured to adjust at least one of the tilt of the device main body 4A with respect to the plane (X1Y1 plane) perpendicular to the +Z1 direction (e.g., the tilt at a center which is an axis along the +X1 direction) and the position of the device main body 4A in the ±Z1 direction. The adjuster configured to adjust the tilt of the device main body 4A, when included in any one of the upper extension portion 51A and the device main body 4A, allows the user US to adjust the tilt of the device main body 4A even after the supporting member 5A and the device main body 4A are mounted on the head HD by the band 5. On the other hand, the adjuster configured to adjust the position of the device main body 4A, when included in any one of the upper extension portion 51A and the device main body 4A, allows the user US to adjust the position of the device main body 4A even after the supporting member 5A and the device main body 4A are mounted on the head HD by the band 5. Thus, it is easy to dispose the device main body 4A at a suitable position that allows the user US to view an image.

The adjuster may be included in the lower extension portion 52A. In other words, the adjuster may be included in the supporting member 5A or the device main body 4A.

As with the lower extension portion 52, the lower extension portion 52A has a substantially W shape that extends in the left-and-right direction, when viewed from the front side (the +Z1 direction side). The central portion of the lower extension portion 52A in the left-and-right direction is provided as the deformation restricting portion 52A1 configured to be abuttable with the bottom face (the face on the −Y1 direction side) of the protruding portion 47A2.

As with the deformation restricting portion 521, when the lower extension portion 52A is deformed upward by an impact or the like, the deformation restricting portion 52A1 comes in abutment with the protruding portion 47A2 from below, thus restricting the deformation of the lower extension portion 52A. The deformation restricting portion. 52A1 is disposed to provide a space between the protruding portion 47A2 and the deformation restricting portion 52A1 in the up-and-down direction (the +Y1 direction). However, the deformation restricting portion 52A1, not limited to that arrangement, may be in contact with the protruding portion 47A2 beforehand.

In Second Exemplary Embodiment, the protruding portion 47A2 also functions as a nose pad. However, the protruding portion 47A2 may not function as such. In this case, as with the lower extension portion 52, the inverted V-shaped portion of the lower extension portion 52A at the substantially center may also function as a nose pad, or the device main body 4 or another portion may be provided additionally with a nose pad.

Advantages of Second Exemplary Embodiment

The face mask unit 1A according to Second Exemplary Embodiment described above has the same advantages as in face mask unit 1 and also the following advantages.

The light guide member 48 includes the light guide member 48 and the right-eye light guide portion 48R, which are provided separately. The device main body 4A includes the frame member 47A, which is a cover member that covers the top faces of the light guide member 48 and the right-eye light guide portion 48R. With that configuration, the light guide portions 48L and 48R are protected by the frame member 47A. The light guide portions 48L and 48R are also fixed to the housing 411 of the emission units 41L and 41R, respectively. The housings 411 are accommodated in the frame member 47A and the lower cover members 46L and 46R. In other words, the light guide portions 48L and 48R and the frame member 47A are integrated, and the rigidity of the device main body 4A is enhanced. Thus, the rigidity of the display unit 3A is enhanced.

The upper extension portion 51A and the device main body 4A are connected by the connection portion 51A1. The connection portion 51A1 is connected to a portion of the frame member 47A of the device main body 4A between the left-eye light guide portion 48L and the right-eye light guide portion 48R. With that configuration, the left emission unit 41L and the right emission unit 41R are less likely to be displaced even when the stress to the rear side is applied to the band 6. Thus, the display position of the image, which is emitted from the emission units 41L and 41R and guided to the light guide portions 48L and 48R, is prevented from varying.

The connection portion 51A1 is connected to a portion of the device main body 4A between the left-eye light guide portion 48L and the right-eye light guide portion 48R, that is, a substantially central portion of the device main body 4A. Thus, the device main body 4A is stably supported by the supporting member 5A.

Modifications of Exemplary Embodiments

The disclosure is not limited to the exemplary embodiments described above, and various modifications, improvements and other variations to the exemplary embodiments are possible.

In First Exemplary Embodiment, the deformation restricting portions 511 and 521 are provided in the upper extension portion 51 and the lower extension portion 52 of the supporting member 5, respectively. In Second Exemplary Embodiment, the deformation restricting portion 52A1 is provided in the lower extension portion 52A of the supporting member 5A. However, the deformation restricting portion, not limited to that configuration, may be included in at least one of the upper extension portion and the lower extension portion. As an example, in the supporting member 5, the deformation restricting portion may be included only in the upper extension portion 51 or only in the lower extension portion 52. As another example, in the supporting member 5A, the lower extension portion 52A may be configured to function as the connection portion 51A1, or the upper extension portion 51A may include the deformation restricting portion in place of the connection portion 51A1.

In addition, the position of the deformation restricting portion and the abutment position of the deformation restricting portion with the device main body may be modified as appropriate, and the number of deformation restricting portions may also be modified as appropriate. The position and the number of the connection portion(s), which connects one of the upper extension portion and the lower extension portion and the device main body, may be modified as appropriate.

For example, the connection portion may be provided in the device main body.

In the exemplary embodiments described above, when the stress is applied to the supporting member 5 or 5A, the deformation restricting portions 511 and 521 or the deformation restricting portion 52A1 come(s) in abutment with the device main body 4 or 4A and thus restrict the deformation of the supporting member 5 or 5A (the deformation of the extension portion which includes the deformation restricting portion and is subjected to the stress, of the upper extension portion and the lower extension portion). However, the deformation restricting portion, not limited to that configuration, may be in contact with the device main body or coupled to the device main body beforehand, as described above. In the latter arrangement, the deformation restricting portion also functions as a connection portion that connects the extension portion and the device main body.

In First Exemplary Embodiment, the light guide member 43 is an integrated component that includes the left-eye light guide portion 43L, the right-eye light guide portion 43R, and the joint portion 43C. In Second Exemplary Embodiment, the light guide member 48 includes the left-eye light guide portion 48L and the right-eye light guide portion 48R, which are each provided separately. The light guide member 43 or 48 is optionally available as appropriate. For example, the device main body 4 may include the light guide member 48, while the device main body 4A may include the light guide member 43.

In the exemplary embodiments described above, the housing 411 of each emission unit 41 is directly connected to the light guide member 43 or 48. However, the connection, not limited to directly, may be of the housing and the light guide member thorough another member. In other words, the holding structure may be modified as appropriate by arranging the emission unit and the light guide member at suitable positions.

In the exemplary embodiments described above, in the supporting member 5 or 5A, the band attachment portion 54 is located on the rear side (the −Z1 direction side) with respect to the left emission unit 41L and the right emission unit 41R of the device main body 4 or 4A which is supported by the supporting member 5 or 5A. In addition, the left attachment portion 54L, which constitutes the band attachment portion 54, is located closer to the head HD (to the right) than the left end of the device main body 4 or 4A, and the right attachment portion 54R is located closer to the head HD (to the left) than the right end of the device main body 4 or 4A. However, the position of the band attachment portion 54, not limited to that configuration, may be modified as appropriate. For example, the left attachment portion 54L may be provided in the side face portion 53L4, which is located closer to the head HD with respect to the left projector, and the light attachment portion 54R may be provided in the side face portion 53R4, which is located closer to the head HD with respect to the right projector.

When viewed from the front side (the +Z1 direction side) , the left attachment portion 54L and the right attachment portion 54R may not be located closer to the head HD than the left end and the right end of the device main body 4 or 4A, respectively. For example, the left attachment portion 54L may he located closer to the left than the left end of the device main body 4 or 4A, and the right attachment portion 54R may be located closer to the right than the right end of the device main body 4 or 4A.

In addition, the band attachment portion 54 is a cylindrical portion, which protrudes in the up-and-down direction (the ±Y1 direction).

However, the band attachment portion, not limited to this configuration, may have any other configuration as long as it allows the band 6 to be attached.

In First Exemplary Embodiment, the device main body 4 is fixed and held by the coupling portions 53 (the left coupling portion 53L and the right coupling portion 53R), which are located at both ends of the supporting member 5 in the left-and-right direction. In Second Exemplary Embodiment, the device main body 4A is fixed and held by the connection portion 51A1, which is located at the center of the upper extension portion 51A of the supporting member 5A in the left-and-right direction. The supporting member 5A may include the coupling portion 53. In other words, the supporting member may be configured to fix and hold the device main body at both ends and the center of the supporting member in the left-and-right direction.

Even in a case where the device main body 4 is fixed at least at one of both ends of the supporting member 5 in the left-and-right direction, the fixing of the device main body 4 is not limited to the manner in First Exemplary Embodiment. For example, the device main body 4 or 4A may be fixed to or supported by a side face portion (e.g., the side face portion 53L4 or 53R4) that is located on the user US side with respect to the emission units 41 and crosses the left-and-right direction, with a screw and the like. The device main body 4 or 4A, not limited to by fixing with a fixture such as a screw, may be fixed to the supporting member 5 or 5A by adhesive bonding.

In Second Exemplary Embodiment, the left coupling portion 53AL does not come in contact with the left projector, and the right coupling portion 53AR does not come in contact with the right projector. However, the coupling portions are not limited to that configuration, and at least one of the left coupling portion 53AL and the right coupling portion 53AR may come in contact with the device main body 4A. In other words, at least one of the left coupling portion 53AL and the right coupling portion 53AR does not fix the device main body 4A but may he configured to come in contact with the device main body 4A.

In Second Exemplary Embodiment, the display unit 3A (e.g., any one of the device main body 4A and the supporting member 5A) may include an adjuster configured to adjust at least one of the tilt of the device main body 4A with respect to the X1Y1 plane and the position of the device main body 4A in the ±Z1 direction. That adjuster may he included in the display unit 3 described in First Exemplary Embodiment. In this case, for example, any one of the device main body 4 and the supporting member 5 is configured to include the adjuster at least at one end in the left-and-right direction. In this configuration, the left coupling portion 53L and the right coupling portion 53R may support the device main body 4A so that the device main body 4A is displaceable with the provision of a given clearance or the like.

The adjuster may be divided into a tilt adjuster that adjusts the tilt and a position adjuster that adjusts the position so that the adjusters are separately provided in the display unit 3 or 3A. In this case, the tilt adjuster and the position adjuster may be spaced apart from each other.

In the exemplary embodiments described above, the device main body 4 or 4A includes the left emission unit 41L that emits image for left eye, the right emission unit 41R that emits image for right eye, the left-eye light guide portion 43L or 48L that guides the image for left eye to the left eye of the user US, and the right-eye light guide portion 43R or 48R that guides the image for right eye to the right eye of the user US. However, the device main body, not limited to that configuration, may have any other configuration as long as it makes an image enter at least one of the left and right eyes of the user so that the image is displayed and viewed by the user. For example, the device main body may include only one of a set of the left emission unit and the left-eye light guide portion and a set of the right emission unit and the right-eye light guide portion. The device main body may include one of the left emission unit and the right emission unit and both of the left-eye light guide portion and the right-eye light guide portion, so that the left-eye light guide portion and the right-eye light guide portion guide the image emitted from the one emission unit to the left eye and the right eye, respectively.

In the exemplary embodiments described above, the device main body 4 is configured so that each of the emission units 41L and 41R forms and emits an image according to image information received via the cable CB. However, the device main body 4, not limited to that configuration, may include a receiver that wirelessly receives the image information and be configured to display an image according to the received image information. In this configuration, the left emission units 41L may include a left receiver that receives image information for left eye, and the right emission units 41R may include a right receiver that receives image information for right eye. Alternatively, the device main body 4 may include a single receiver that receives both of image information for left eye and image information for right eye. In the latter case, for example, the receiver may output the image information for left eye of the received image information to the board 412 included in the left emission unit 41L, and output the image information for right eye to the board 412 included in the right emission unit 41R.

In the exemplary embodiment s described above, the face mask unit 1 or 1A is used in fire fighting and the like. However, the face mask unit 1 or 1A, not limited to this, may be used for any other application. For example, the face mask unit according to the disclosure may be used in a certain gas environment, or in sports or games (e.g., a survival game).

The face mask 2 is not limited to a shape for covering the whole face FC on the front side. For example, the face mask 2 may be a face mask including a plurality of extension portions extending along at least one of length and width (e.g., a mask for a baseball catcher or a fencer). The face mask may have a shape for covering a part of the face of the user (e.g., upper half).

The display unit 3 or 3A as a head-mounted image display device is available as a single unit without the face mask 2.

What is claimed is:

1. A head-mounted image display device, comprising:
   a device main body configured to display an image to allow a user to view the image; and
   a supporting member configured to support the device main body, and to be mounted on the head of the user, wherein
   the device main body includes:
   an emission unit configured to emit the image; and
   a light guide member extending in a left-and-right direction of the user, the light guide member configured to guide the image emitted from the emission unit to an eye of the user,
   the supporting member includes an upper extension portion and a lower extension portion, each extending in the left and-right direction, and that are arranged at positions to interpose the light guide member therebetween in an up-and-down direction of the user, and
   at least one of the upper extension portion and the lower extension portion includes a deformation restricting portion protruding toward a direction closer to the main body device to restrict a deformation of the supporting member.

2. The head-mounted image display device according claim 1, wherein
   when a stress that deforms the supporting member is applied to the supporting member, the deformation restricting portion comes in abutment with the device main body to restrict the deformation of the supporting member.

3. The head-mounted image display device according to claim 1, wherein
   the light guide member includes:
   a left-eye light guide portion disposed to face the left eye of the user;
   a right-eye t guide portion disposed to face the right eye of the user; and
   a joint portion integrating the left-eye light guide portion and the right-eye light guide portion.

4. The head-mounted image display device according to claim 1, wherein
   the light guide member includes:
   a left-eye light guide portion disposed to face the left eye of the user; and
   a right-eye light guide portion disposed to face the right, eye of the user, and
   the device main body includes a cover member, the cover member covering at least a part of the left-eye light guide portion and the right-eye light guide portion.

5. The head-mounted image display device according to claim 1, wherein
   the emission unit includes:
   an optical component configured to form the image; and
   a housing configured to accommodate the optical component, the housing being attached to the light guide member.

6. The head-mounted image display device according to claim 1, wherein
   the supporting member includes coupling portions located at both ends in the left-and-right direction, the coupling portions coupling the upper extension portion and the lower extension portion, and
   the device main body is fixed to the coupling portions.

7. The head-mounted image display device according to claim 1, further comprising:
   a connection portion configured to fix the device main body to one of the upper extension portion and the lower extension portion,
   the light guide member includes:
   a left-eye light guide portion disposed to face the left eye of the user; and
   a right-eye light guide portion disposed to face the right eye of the user, wherein
   the connection portion is connected to a portion of the device main body, the portion being between the left-eye light guide portion and the right-eye light guide portion.

8. The head-mounted image display device according to claim 1, further comprising:
   a band extending along the head, wherein
   the supporting member includes a band attachment portion located on a rear side with respect to the emission unit, an end of the band being attached to the band attachment portion.

9. The head-mounted image display device according to claim 8, wherein
   the band attachment portion includes:
   a left attachment portion located on a left side of the supporting member in the left-and-right direction; and
   a right attachment portion located on a right side of the supporting member in the left-and-right direction, and
   at least one of the left attachment portion and the right attachment portion is located at a position closer to the head than an end of the device main body on a side of the at least one of a left attachment portion and a right attachment portion.

10. A face mask unit, comprising:
    the head-mounted image display device according to claim 1; and
    a face mask to be mounted on the head of the user to cover the face of the user, wherein
    the device main body and the supporting member are disposed between the face and the face mask.

11. A head-mounted image display device, comprising:
    a device main body configured to display an image to allow a user to view the image; and
    a supporting member configured to support the device main body, and to be mounted on the head of the user, wherein
    the supporting member includes an upper extension portion and a lower extension portion, each extending along a left-and-right direction, and a light guide member configured to guide the image to an eye of the user is interposed between the upper extension portion and the lower extension portion in an up-and-down direction of the user.

* * * * *